Figure 37:
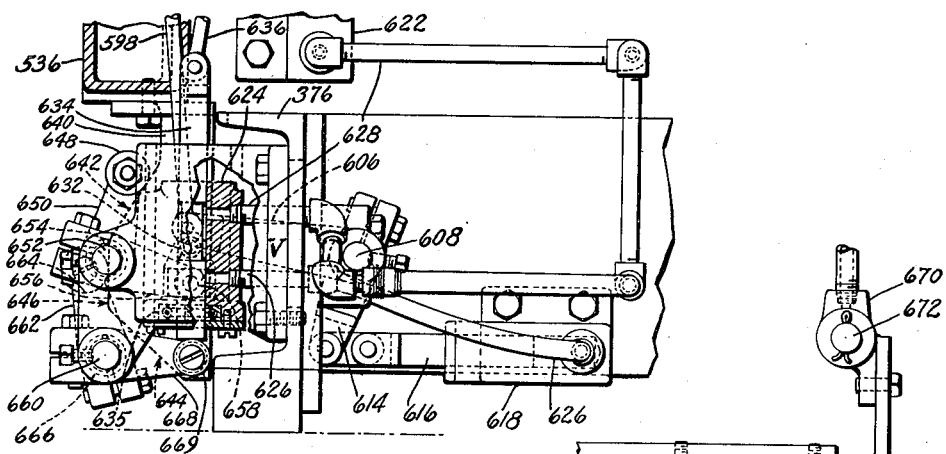

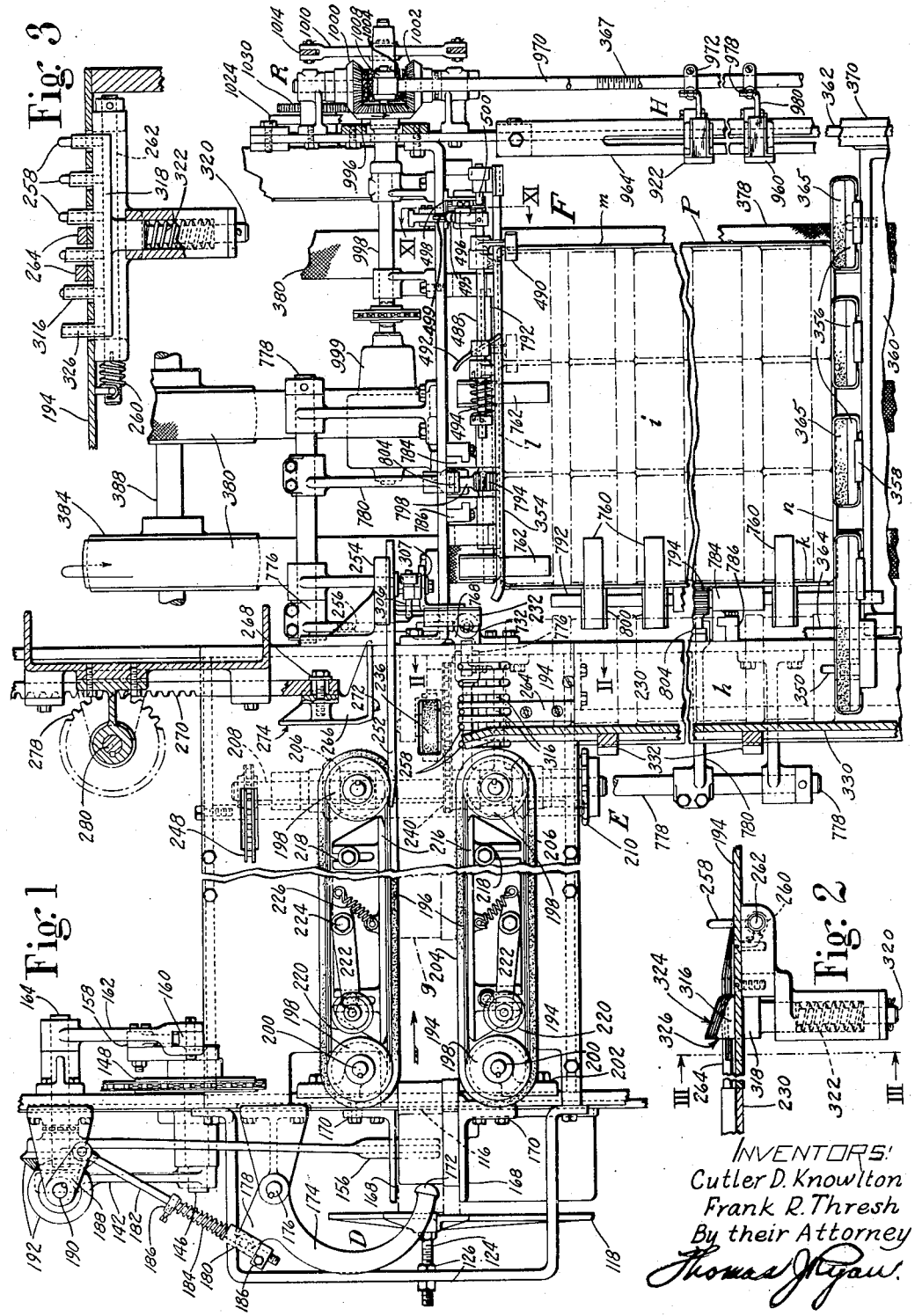

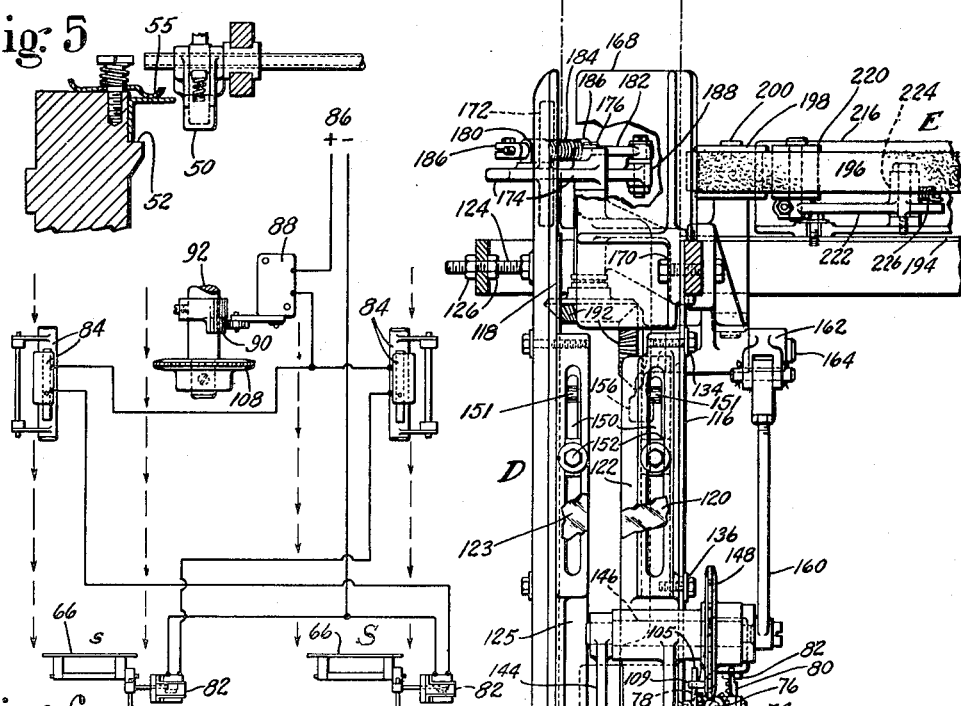
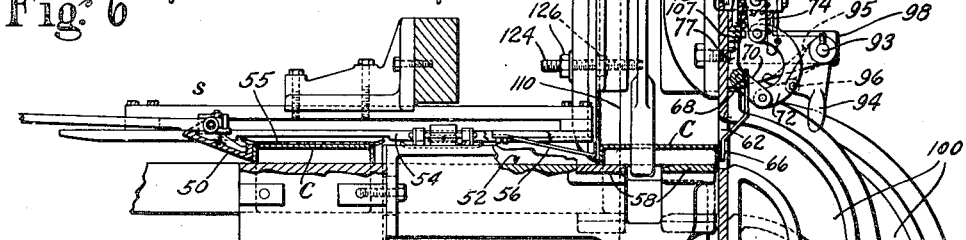
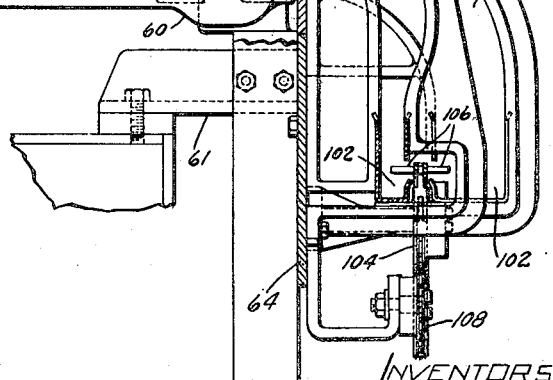

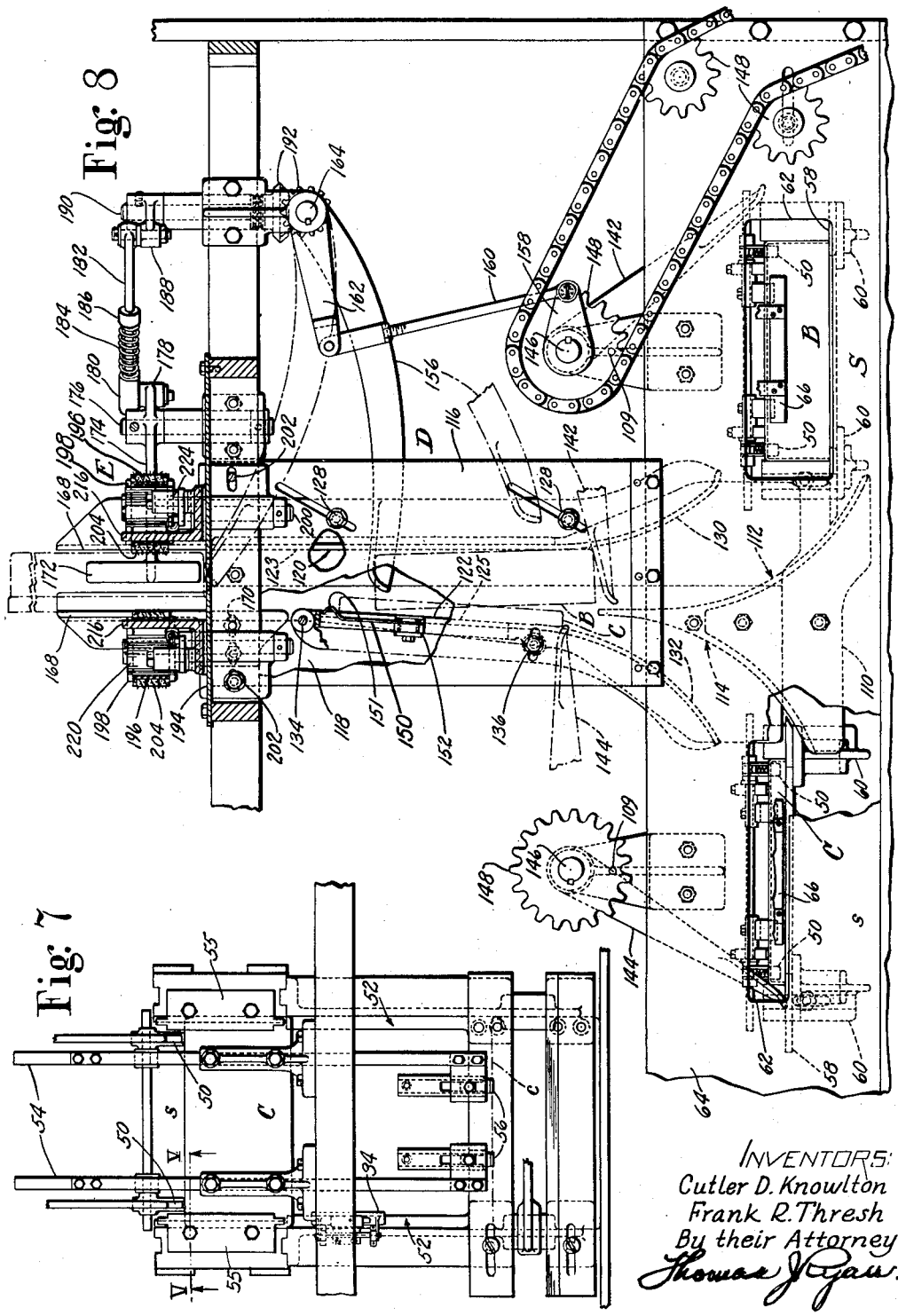

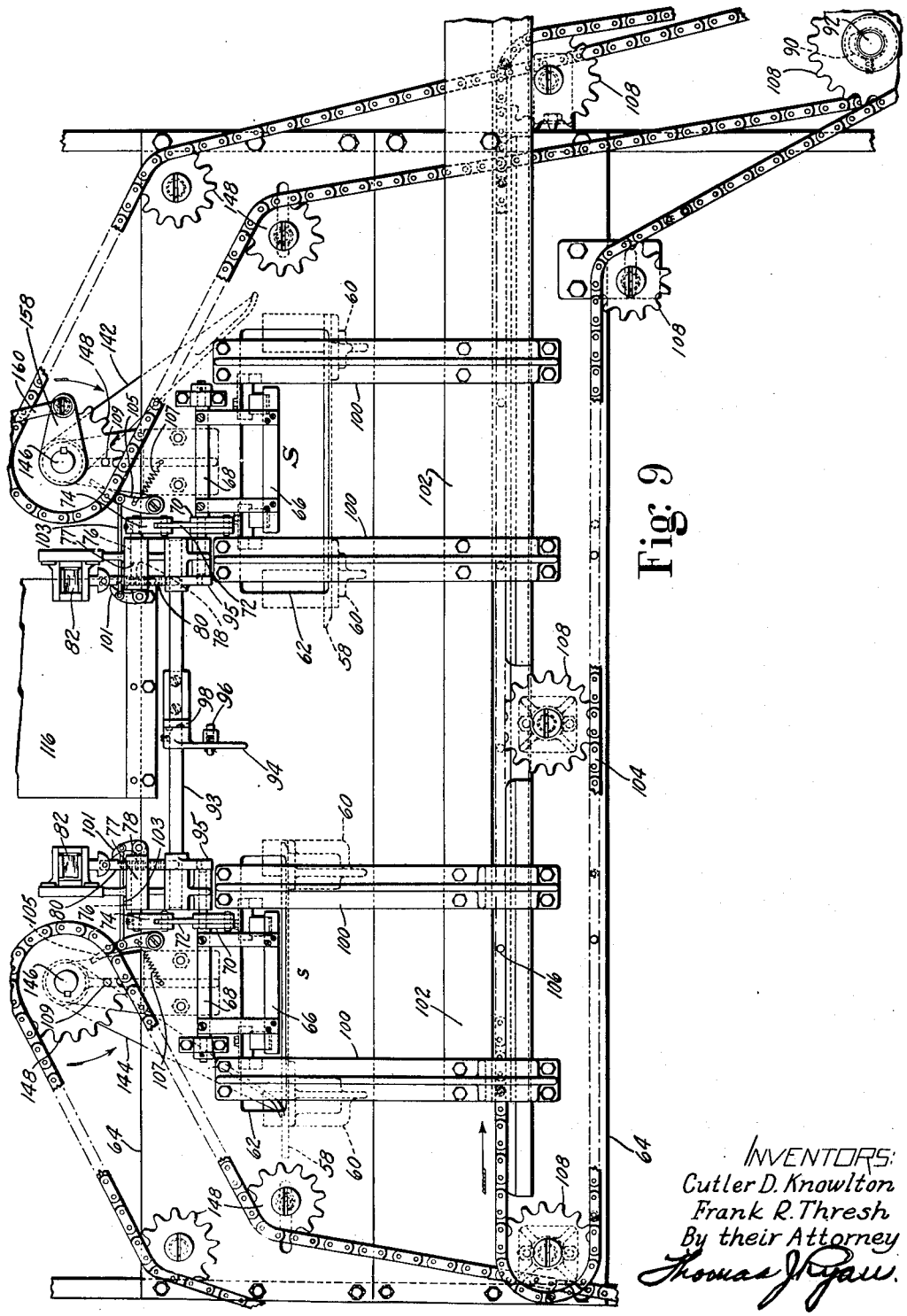

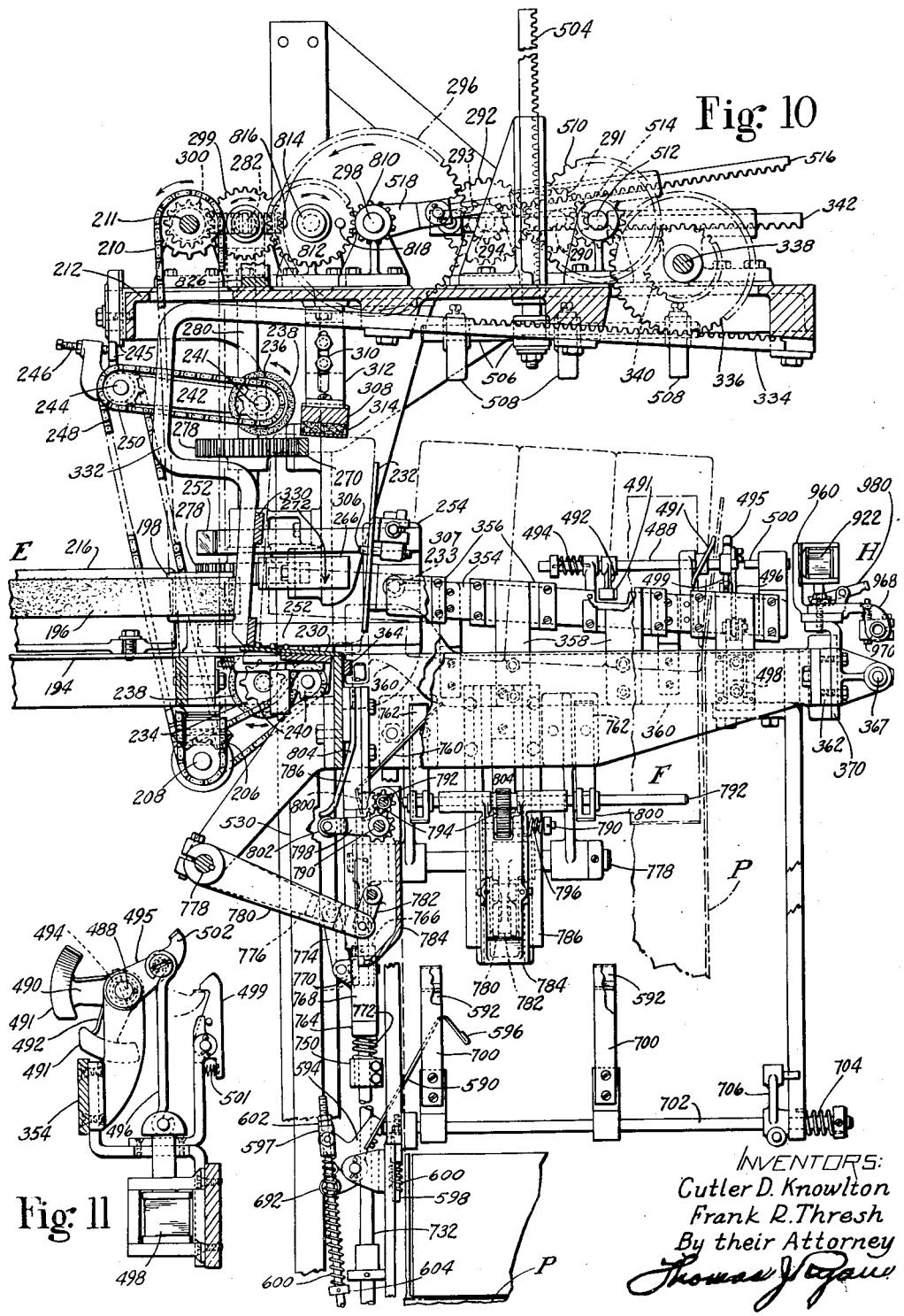

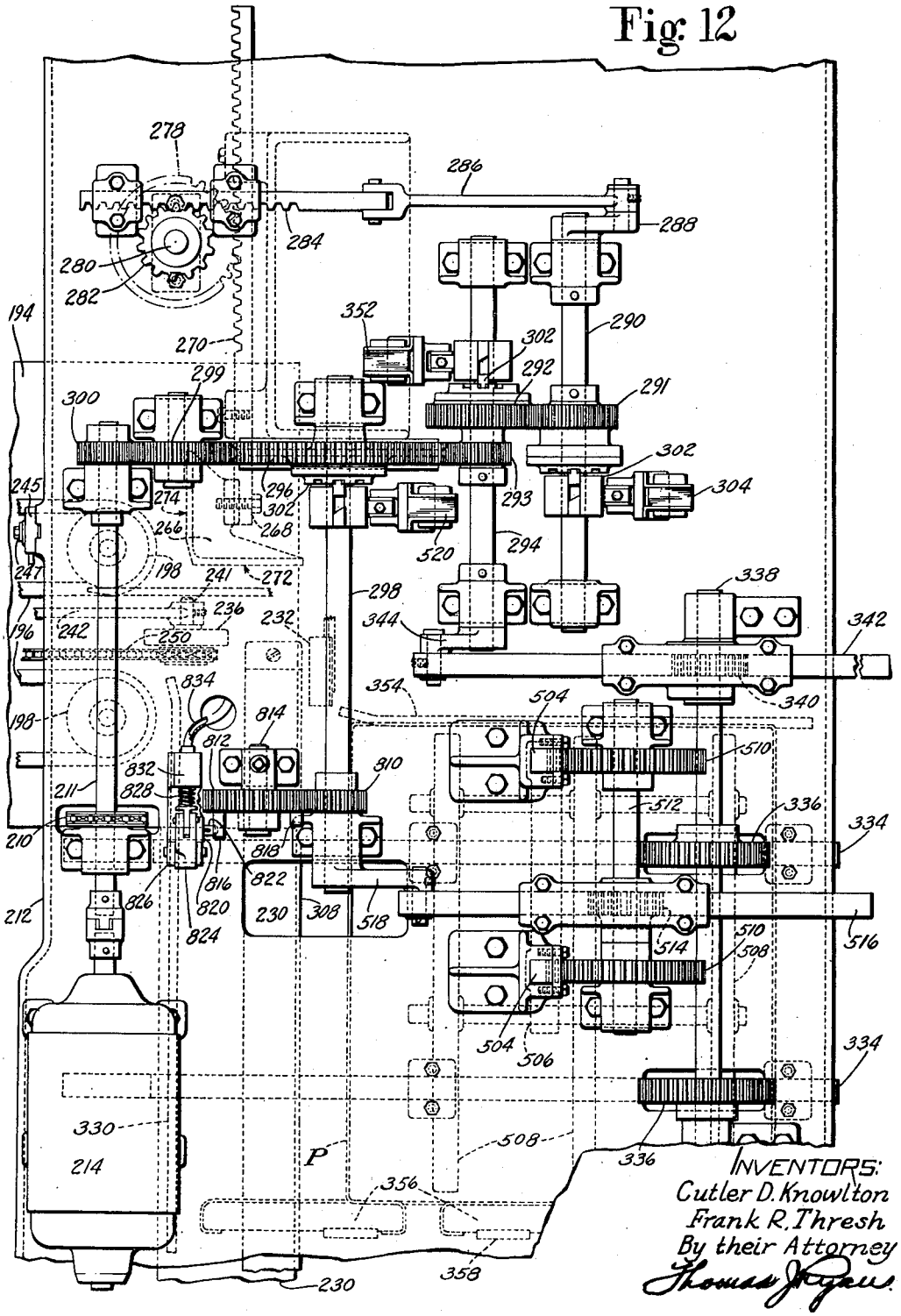

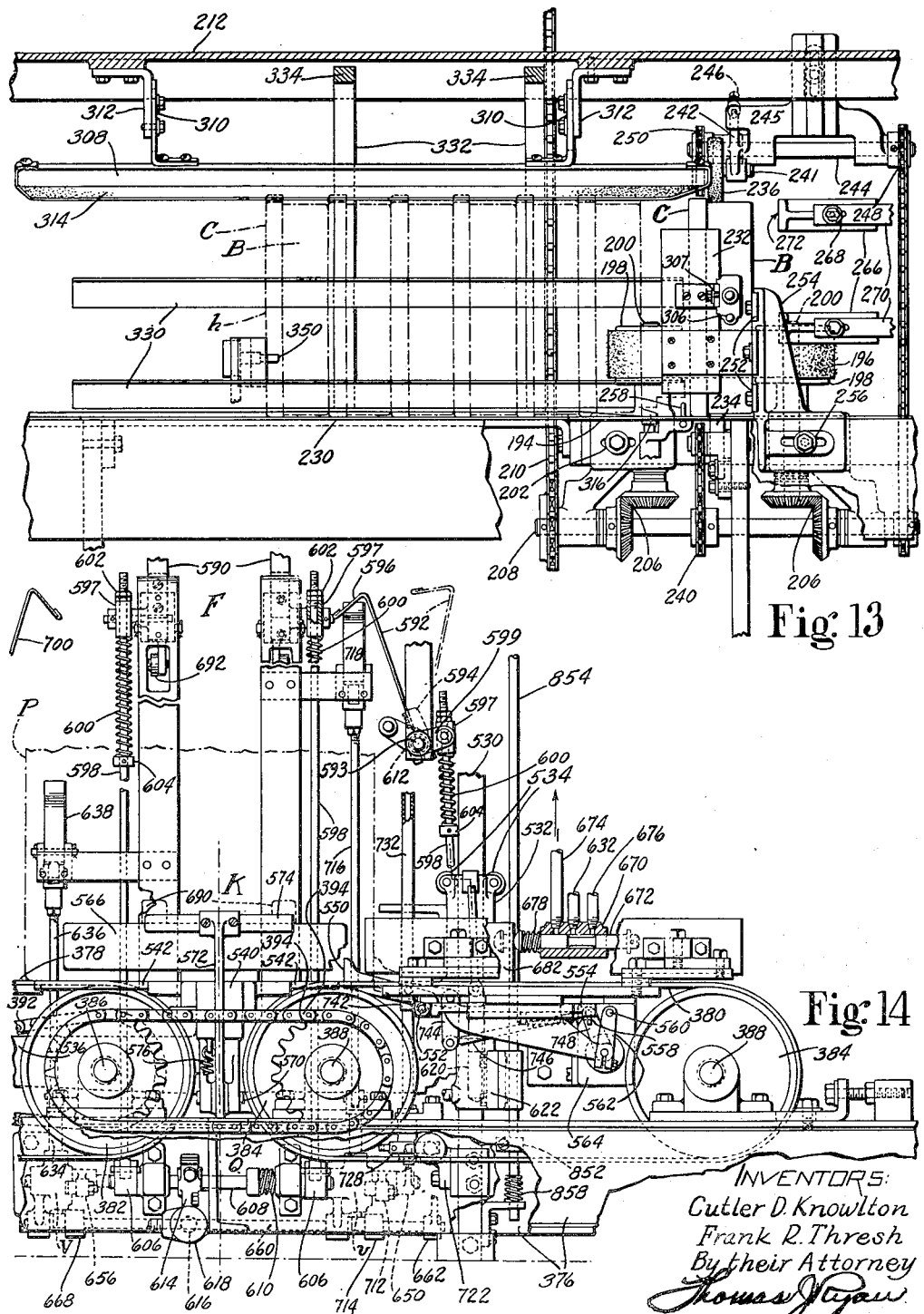

Aug. 26, 1952   C. D. KNOWLTON ET AL   2,608,038
ASSEMBLING AND PACKING ARTICLES
Original Filed May 31, 1941   16 Sheets-Sheet 8
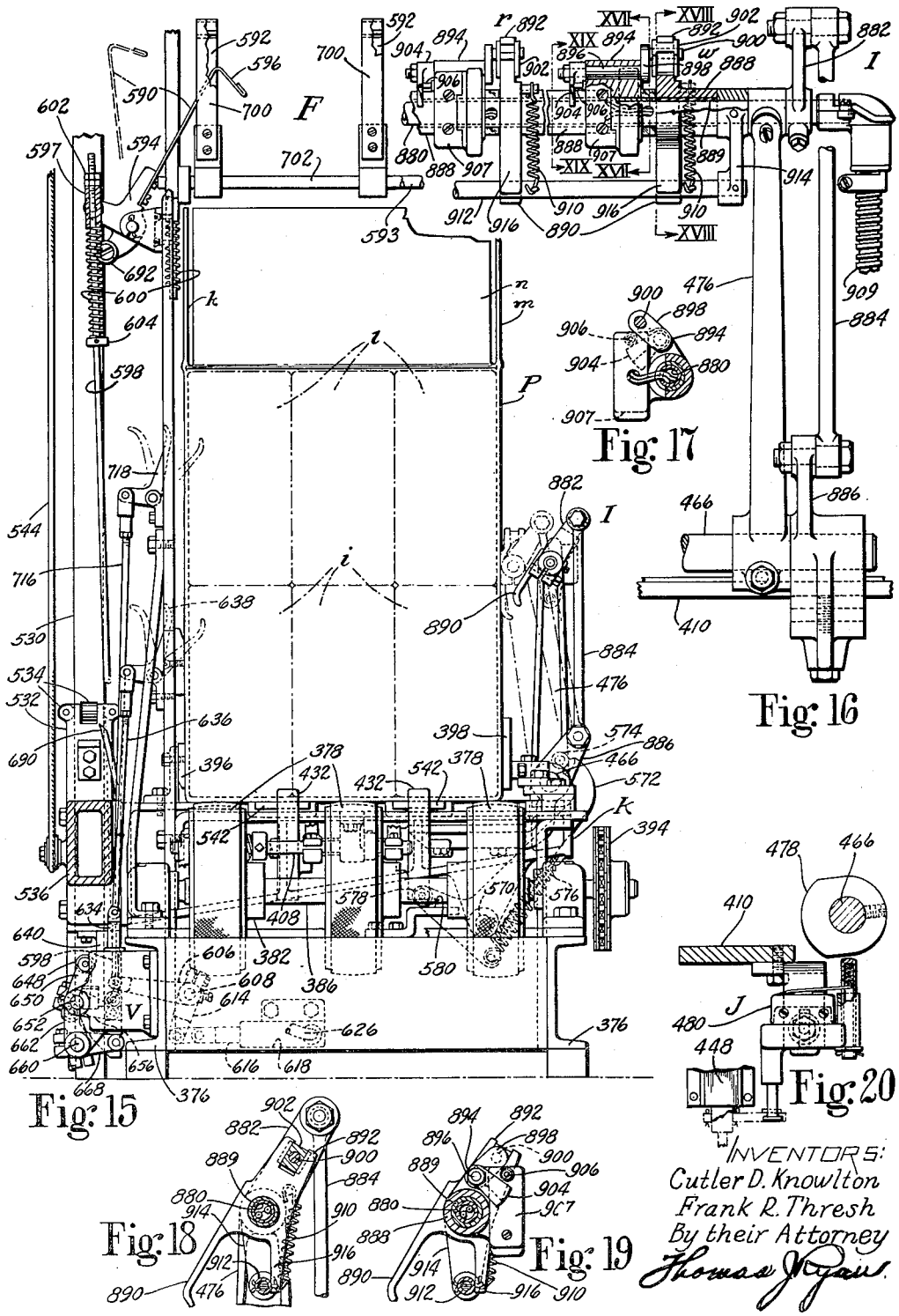

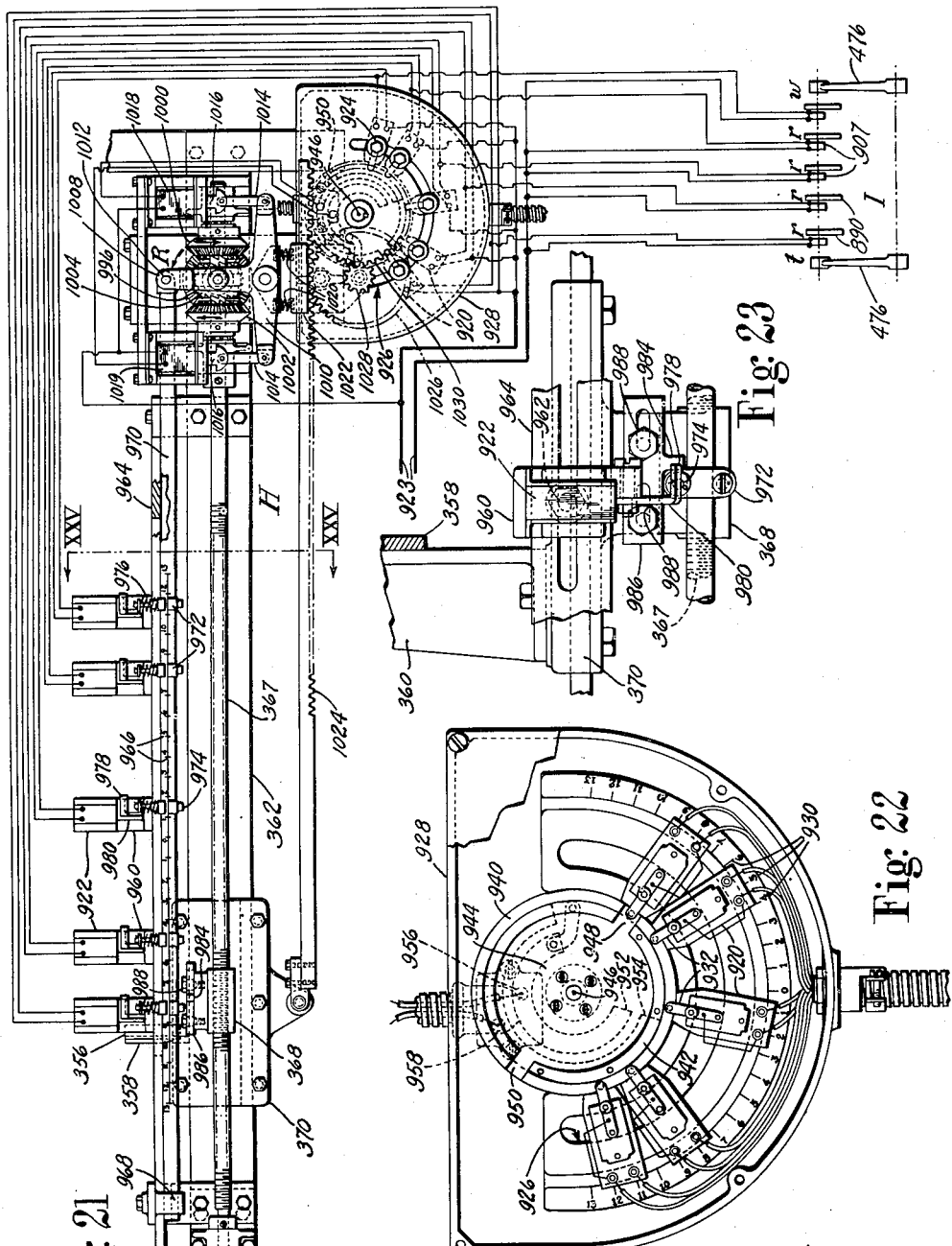

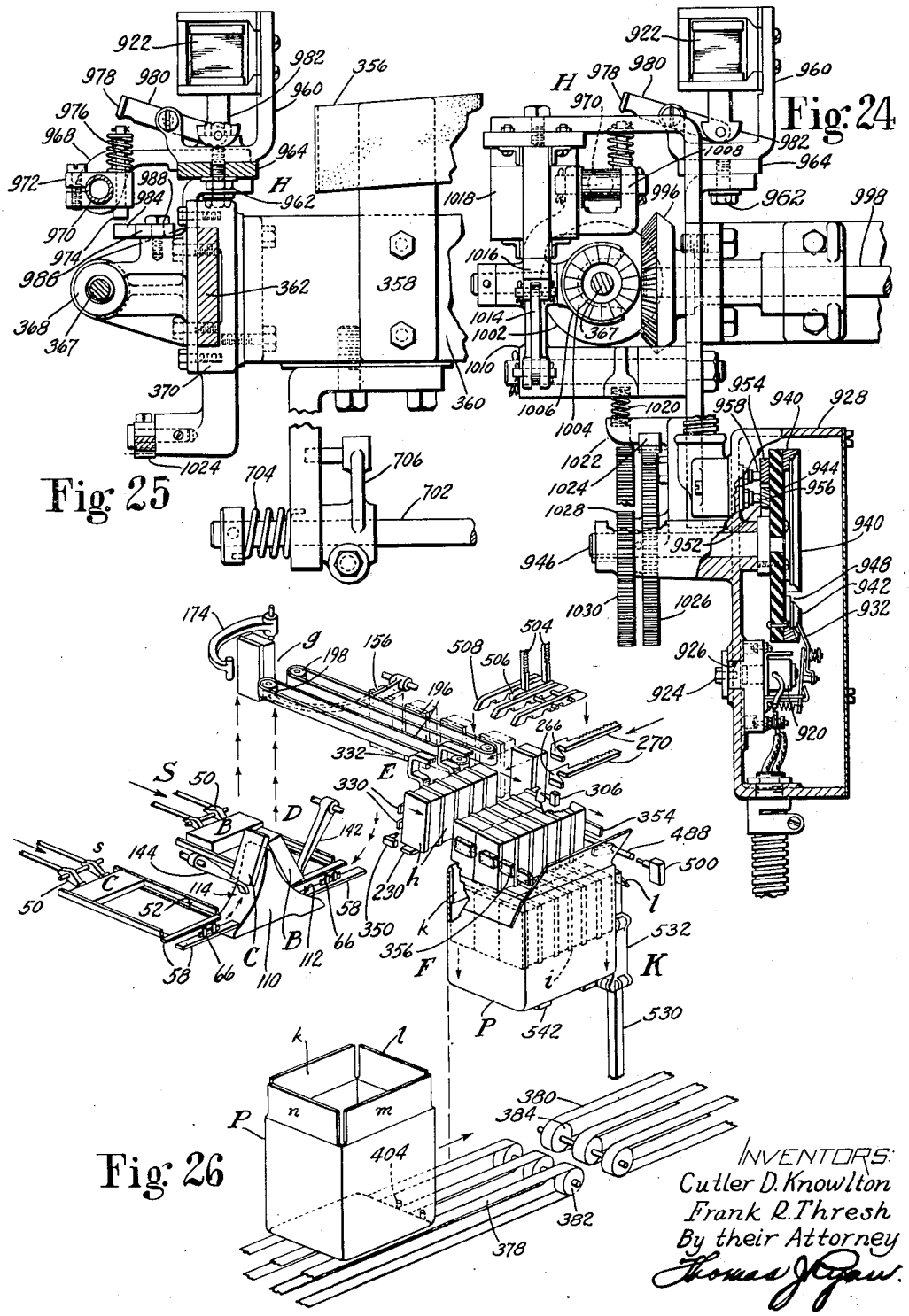

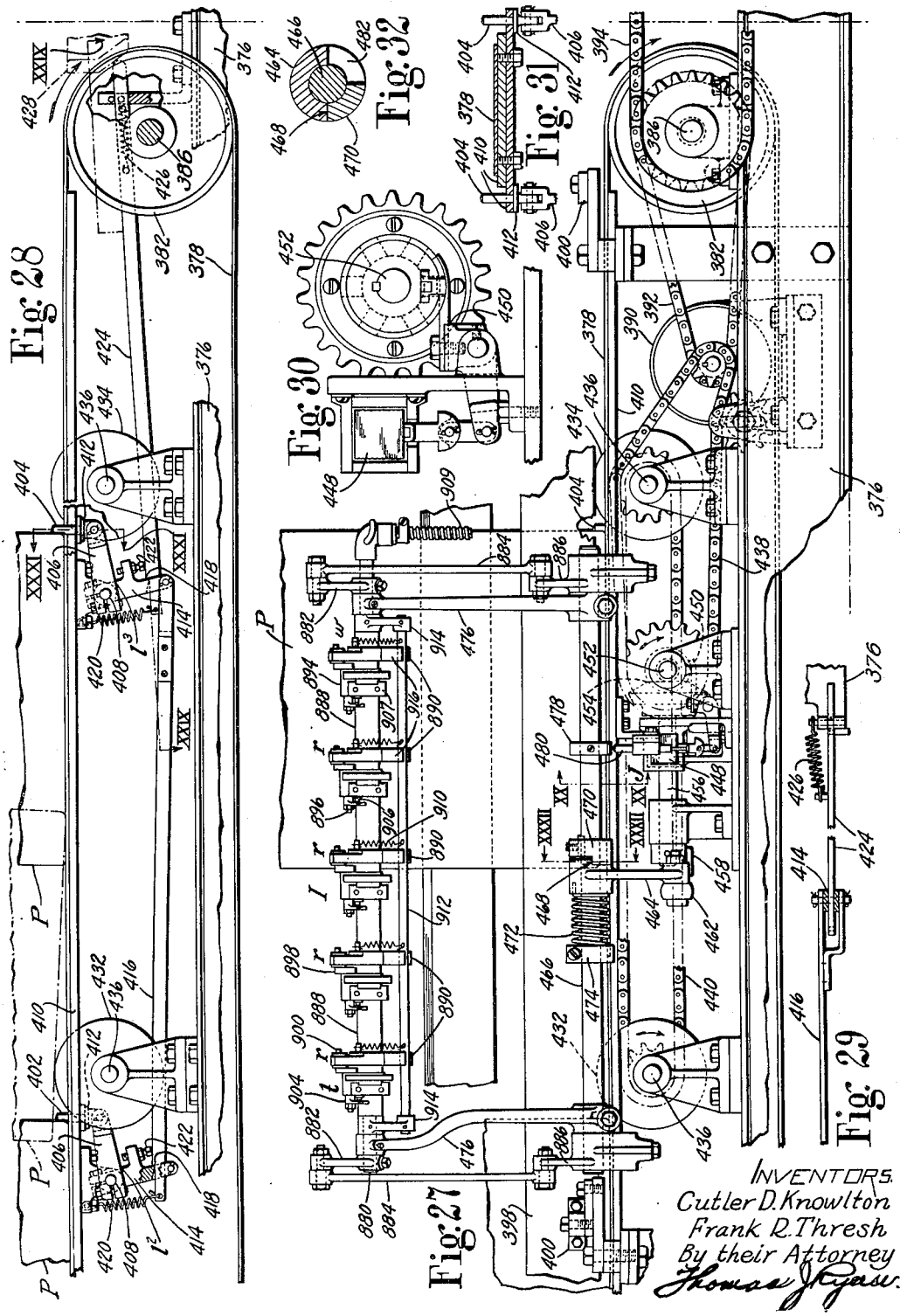

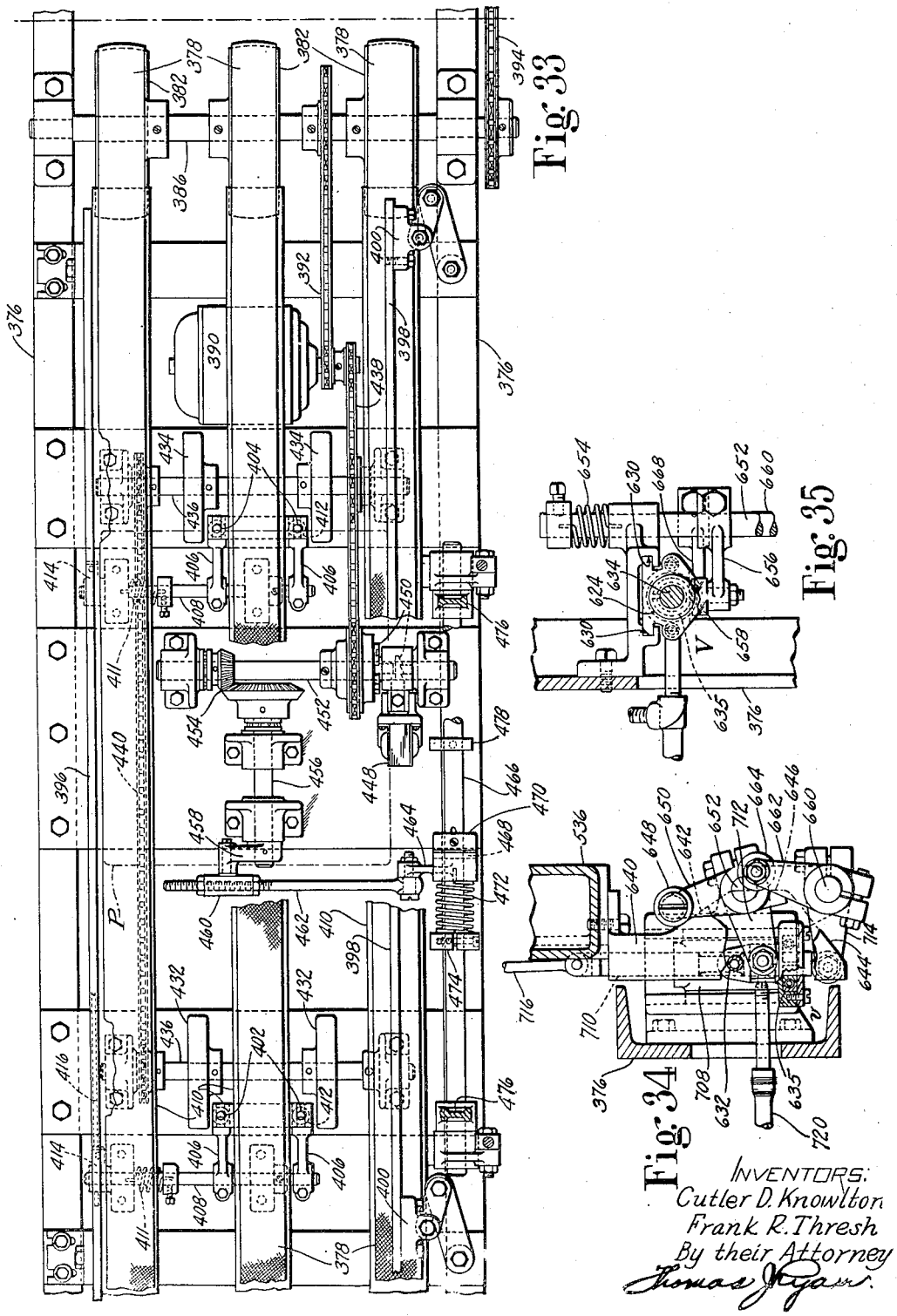

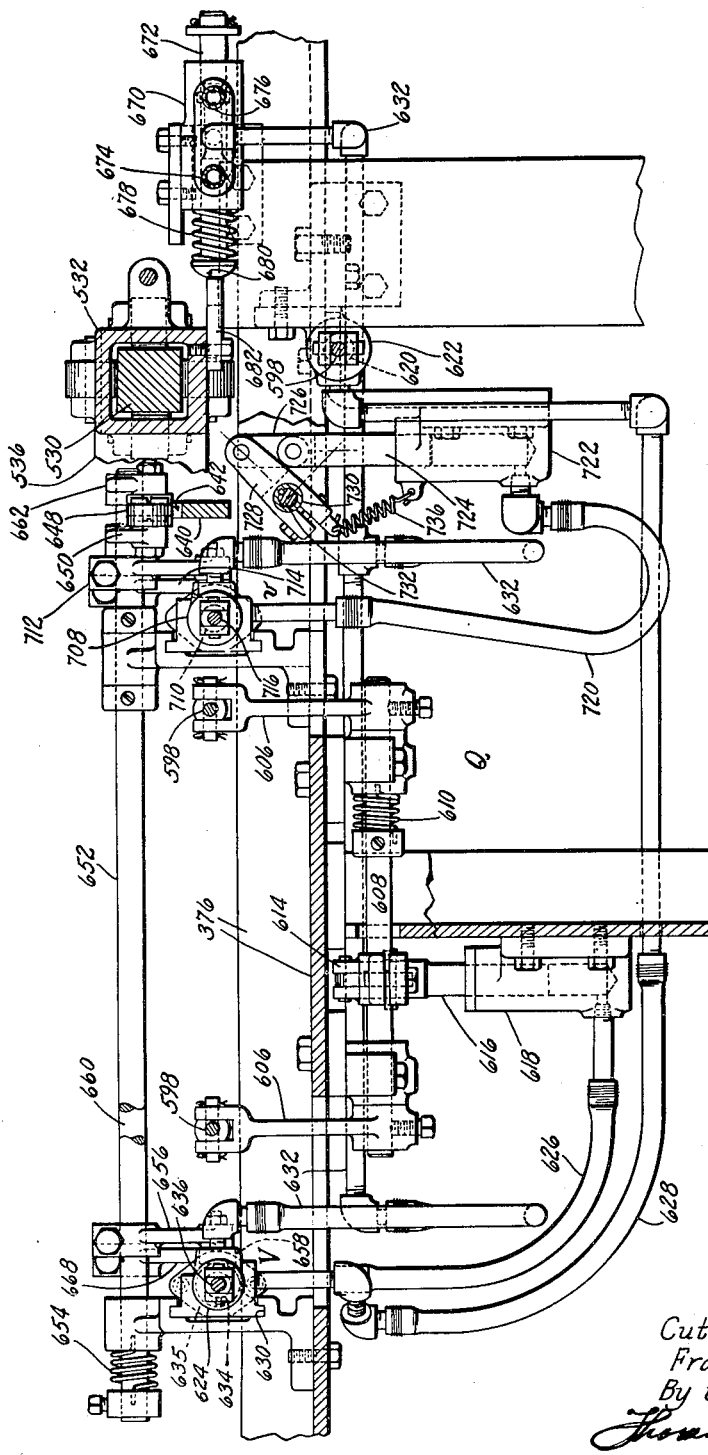

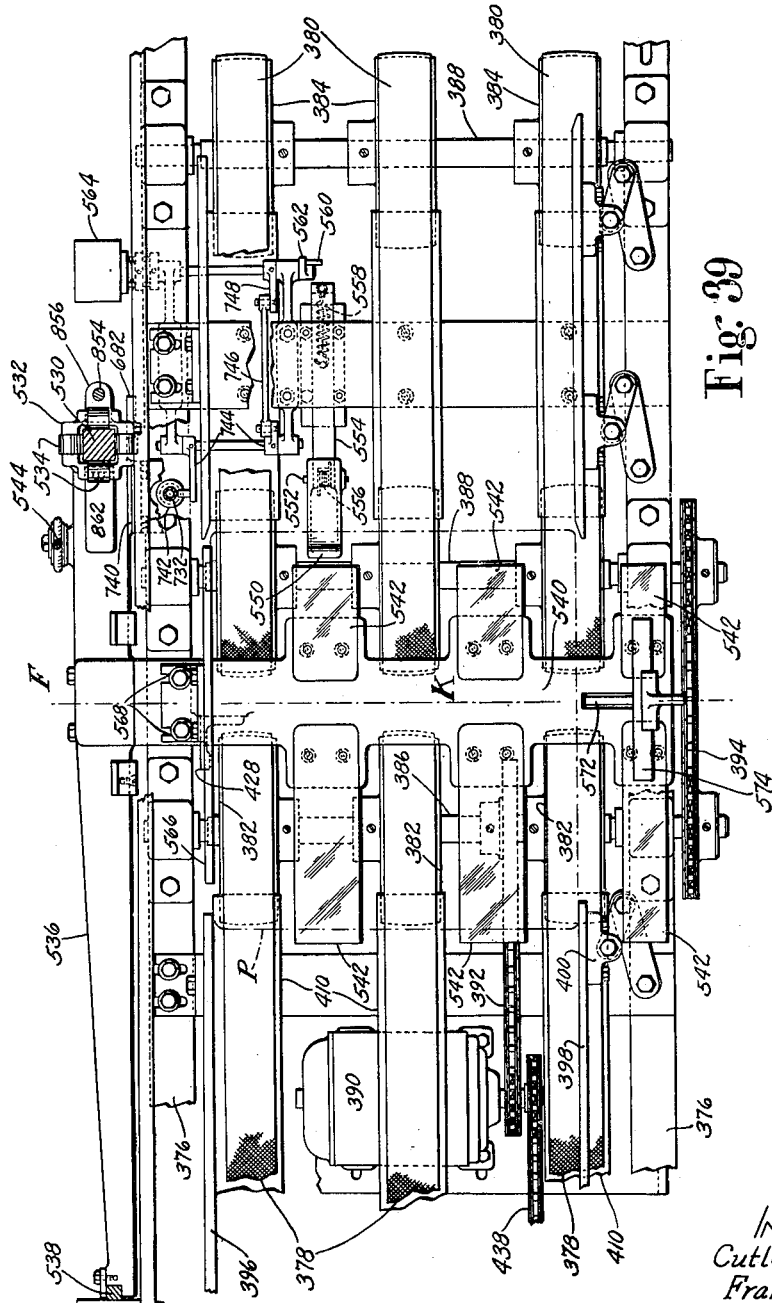

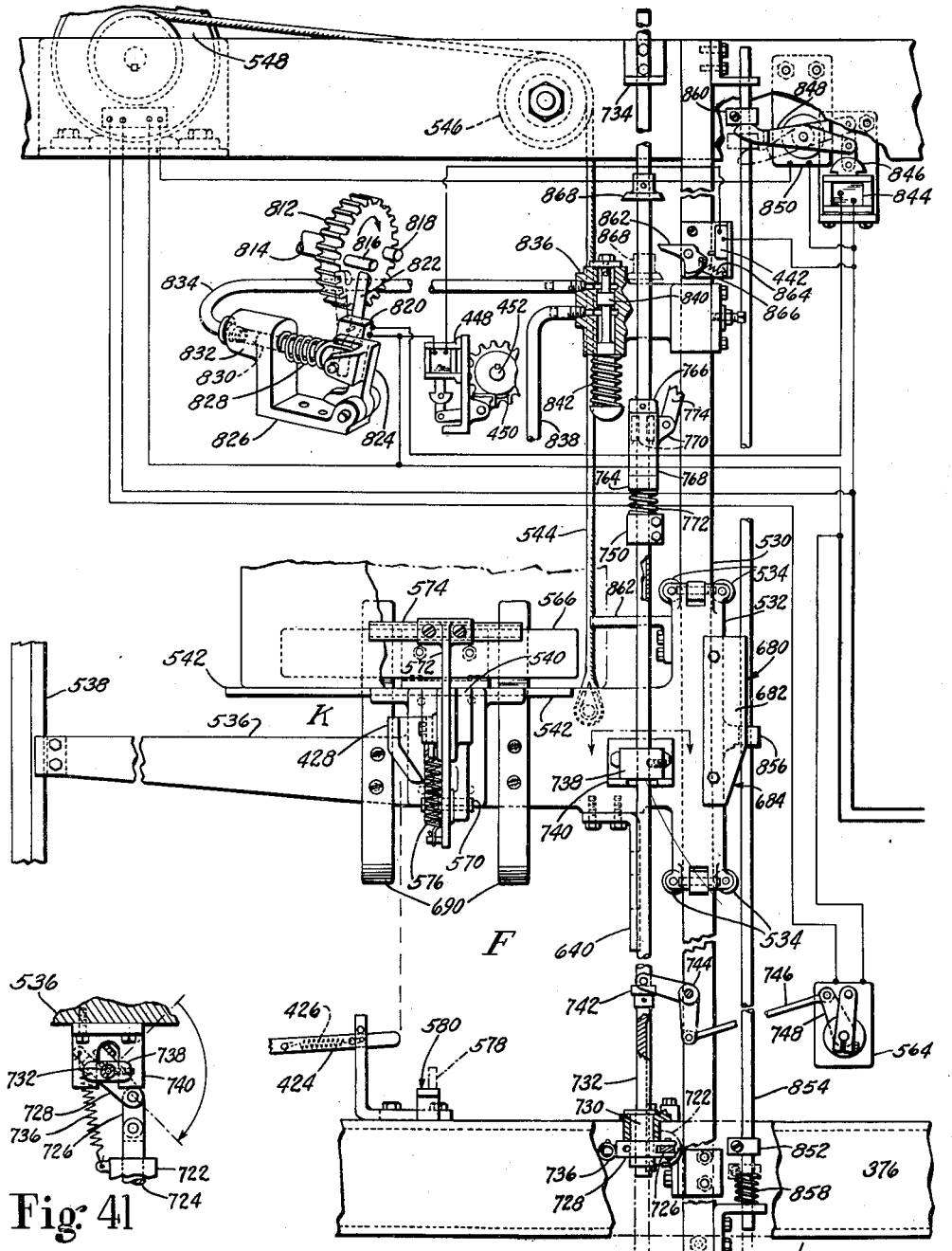

Patented Aug. 26, 1952

2,608,038

UNITED STATES PATENT OFFICE 2,608,038

ASSEMBLING AND PACKING ARTICLES

Cutler D. Knowlton, Rockport, and Frank R. Thresh, Beverly, Mass., assignors to Hoague-Sprague Corporation, Lynn, Mass., a corporation of Massachusetts Original application May 31, 1941, Serial No. 396,226. Divided and this application August 17, 1945, Serial No. 611,084

111 Claims. (Cl. 53—7)

1

This invention relates to the assembling of various articles, it being especially applicable to the arrangement in groups of boxes and their covers. In the making and forwarding of boxes, as those for containing shoes, to manufacturers by whom they are to be used for packaging their product, it is the usual practice to set up boxes and the covers therefor separately, after which each box is closed by the application of a cover. The closed boxes are then taken in groups, and placed in the case in which they are to be shipped. An object of the present invention is to facilitate the casing or packing operations, each step being effected automatically with speed and accuracy.

In the attainment of this object, articles, such as boxes closed with their covers, are successively assembled in series, rows and layers, said layers being deposited in packing cases or containers. The cases to be packed may be successively forwarded, as by conveyors, and temporarily retained in a position to be tested or measured to control the assembling and other mechanisms. The measurements may include the length and width of the case. The first of these is accomplished by a series of feelers or other testing devices, which, by their relation to the end of the case, control electrical means which determines the proper relation between walls holding the rows of box-units for assembly in a layer. At the same time, a detector or contact device which initiates the transfer of a row from its support to a position between the walls is adjusted, as by being mounted upon the wall moved, to locate it in accordance with the length of the row to be acted upon. The second measurement is as to the width of the case, this being obtained by the extent of movement of the entire series of the first-mentioned testing devices, and positioning a detector for the layer-depositing member, so this will act when the desired number of rows have been assembled in a layer. The cases are received by means, herein shown as an elevator, which presents them to be packed. In this latter movement, closing laps, with which the case-walls are provided, are acted upon by members to both turn said laps out to avoid interference with elements of the machine, and to turn them in to leave exposed portions of the labels which the box-units bear. Certain of the turn-out members are best operated selectively, while the turn-in members act upon each case presented to them. There may be also some turn-out members effective for all cases. The elevator is started in its movement by the arrival of a case upon it, and is stopped at a level determined by the number of

2 layers which the case is to receive. Its descent is initiated under the control of the mechanism by which the layers of box-units are deposited upon it and is stopped by means which it actuates. Feelers or like means move to test dimensions of the case upon the elevator, for the purpose of correctly stopping the ascent of said elevator and for controlling the lap-turning means. The feelers, jointly with a cam or like means moved by the elevator, govern, as by setting valves, fluid-pressure means by which stop mechanism for the elevator and actuating mechanism for the lap-turning means are respectively operated. As to the first of these, the height of the case is tested, and an element of the stop mechanism set in accordance with the the test. As to the second, a test is made of the length of the case and a chosen lap-turn-out member operated, since the best exposure of the box-labels may be arrived at from this dimension.

Another object of the invention relates to the method performed in the folding of the case-laps for the exposure of labels upon articles. As a case is upon its way to the packing position, a test is made of a dimension and one or another of the laps folded, as by turning out the lap determined by the test and thereafter turning in another lap. The in-turning action may be produced, regardless of the lap which has been turned out. The lap-folding or turning having been accomplished, the articles are inserted in the case while the lap is in-folded.

The present case is a division of the application filed in our names in the United States Patent Office on May 31, 1941, and bearing the Serial Number 396,226, now Patent No. 2,400,153, granted May 14, 1946.

Figure 38:
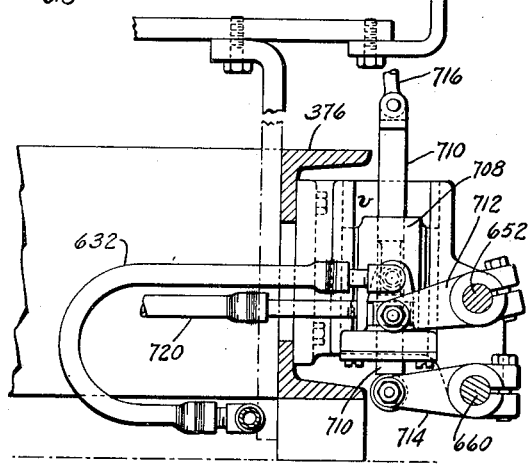
Figure 42:
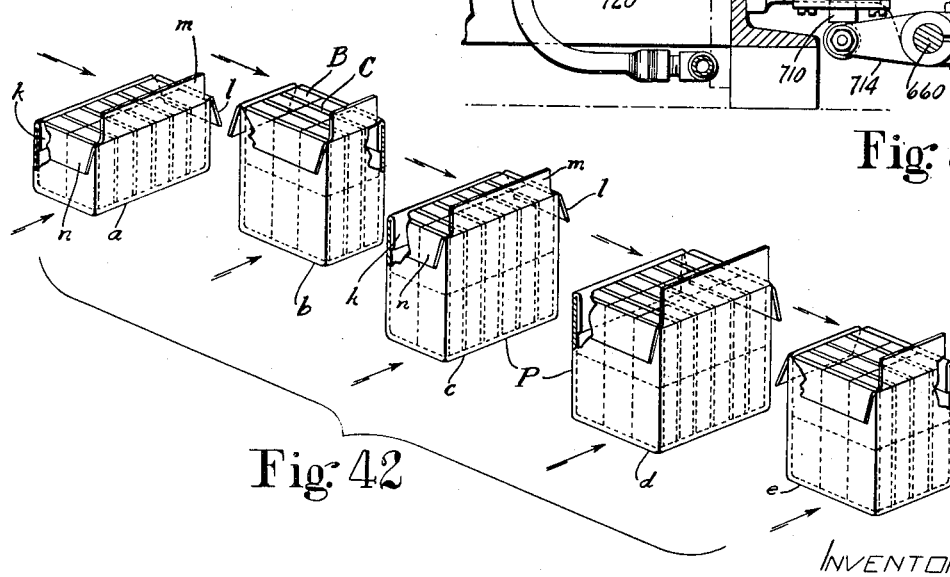

In the accompanying drawings illustrating one of many possible embodiments of our invention, Fig. 1 is a top plan view of the improved machine, a portion of the operating mechanism above the casing section being removed;

Fig. 2, an enlarged sectional detail on the line II—II of Fig. 1, showing the retaining means for the closed boxes which are being arranged in a row;

Fig. 3, a sectional detail on the line III—III of Fig. 2;

Fig. 4, a broken side elevation of the closing section, looking from the right of the machine;

Fig. 5, an enlarged transverse section on the line V—V of Fig. 7;

Fig. 6, a diagrammatic view of means for determining and rejecting unmatched boxes and covers;

Fig. 7, a top plan view of the final section of the setting up machine with which the apparatus of the present invention co-operates, together with the immediately adjacent portion of such apparatus;

Fig. 8, a transverse section through the receiving portion of the assembling section, looking rearwardly with respect to the advance of the work;

Fig. 9, an elevation of the lower portion of the closing section, together with the determining and rejecting means, it being viewed in the same direction as Fig. 8;

Fig. 10, a broken side elevation of the inner portion of the assembling section, together with the casing section;

Fig. 11, an enlarged sectional detail of the detector for controlling the delivery of an assembled layer of closed boxes to a packing-case, this being taken on the line XI—XI of Fig. 1;

Fig. 12, an enlarged top plan view of the operating mechanism for the assembling and casing sections;

Fig. 13, a partial elevation of the assembling section, looking rearwardly through the receiving portion;

Fig. 14, a rear elevation of the lower portion of the casing section;

Fig. 15, a side elevation thereof, looking from the left in Fig. 14;

Fig. 16, a broken detail in elevation of the testing mechanism, which measures the horizontal dimensions of the cases to be filled;

Figs. 17, 18 and 19, sectional details on the lines XVII—XVII, XVIII—XVIII and XIX—XIX, respectively, of Fig. 16;

Fig. 20, a similar view, enlarged, on the line XX—XX of Fig. 27;

Fig. 21, a view in elevation of the wall-adjusting mechanism governed by the testing mechanism of Fig. 16;

Fig. 22, an enlarged elevation of the relay mechanism of Fig. 21, viewed oppositely from Fig. 21;

Fig. 23, an enlarged top plan view of one of the solenoids of Fig. 21;

Fig. 24, a broken enlarged elevation, looking from the right in Fig. 21;

Fig. 25, an enlarged transverse section on the line XXV—XXV of Fig. 21;

Fig. 26, a diagrammatic perspective illustrating the courses of the box-parts through the closing, assembling and casing sections of the machine;

Fig. 27, an elevation, as viewed from the rear of the machine, of the dimension-determining means partially illustrated in Fig. 16, together with the means for successively advancing the cases to be tested;

Fig. 28, a similar view of the stop mechanism for the cases;

Fig. 29, a broken sectional detail on the line XXIX—XXIX of Fig. 28;

Fig. 30, a detail in elevation of the mechanism for controlling the clutch of Fig. 27;

Figs. 31 and 32, transverse sectional details on the lines XXXI—XXXI and XXXII—XXXII of Figs. 28 and 27, respectively;

Fig. 33, a plan view of the mechanism of Fig. 27, with parts broken away;

Fig. 34, a detail in broken side elevation of the valve by which the elevator-stop is controlled;

Fig. 35, a top plan view of the valve through which the lap-turning fingers are retracted;

Fig. 36, a broken top plan view of the entire valve mechanism;

Fig. 37, a broken side elevation of the valve of Fig. 35;

Fig. 38, a vertical section showing the external form of the valve of Fig. 34 and taken at the left of the elevator cam;

Fig. 39, a plan of the elevator and associated conveyors, taken in a plane just above the case-supporting surfaces;

Fig. 40, a side elevation of the elevator, with its controlling and controlled mechanisms;

Fig. 41, a top plan view of a portion of the means for governing the extent of upward movement of the elevator; and Fig. 42, a diagrammatic representation in perspective of different box-arrangements in cases to be packed.

Referring particularly to Figs. 4, 5, 7, 8 and 9 of the drawings, there appears at S, s the delivery portions of a machine for folding or setting up from flat blanks a box B and a cover C, respectively. This apparatus may be as disclosed in Letters Patent of the United States No. 2,042,472, Knowlton, June 2, 1936, the boxes and covers being of the elongated form in which pairs of shoes are customarily enclosed for the retail trade. After the formation of these box-parts, they are advanced by reciprocatory pushing fingers 50, 50 along narrow supporting surfaces 52, 52 beneath retaining bars 54 and spring-pressed plates 55, the major dimensions of the box-parts extending transversely of their paths. The fingers carry the box-parts beneath spring-fingers 56, which hold them against rearward movement, on to horizontal supporting plates 58 upon which they lie end to end in horizontal alinement. These plates are mounted upon an end-frame 60 at the beginning of the machine of the present invention, the general organization of which is illustrated diagrammatically in Fig. 26. This has a section D, in which each advancing box B, moving vertically, has a cover C applied to it. This is followed by a section E, in which the closed boxes are received, traveling horizontally at g and delivered to be assembled in horizontal rows at h by movement in a direction at right-angles to their receipt. Then, with another change in direction in section E, at right-angles to the preceding, they are assembled at i in layers made up of a plurality of rows. Finally, at section F, successive layers are carried down into a packing case P. The cases to be packed may be of different dimensions and adapted to contain different numbers of box-units. These cases with the contained box-units are shown diagrammatically in Fig. 42 of the drawings. The case a will contain twelve of the closed boxes in one layer with their lengths vertically disposed. The cases b, c, d and e hold, respectively, eighteen, twenty-four, thirty-six and twenty-four of the units, each in two layers and with the lengths vertical. For the closure of the cases after packing, their longitudinal walls have joined to their upper edges by creases, laps k and m, while the transverse walls carry like laps n and l.

Before the closing of the boxes is initiated, it is desired to determine whether there have arrived together from the setting-up sections S and s, a box and a cover, and, if one of these is missing, to reject the other, so an incomplete unit shall not go through the machine. Each plate 58 has at its forward side an opening 62 (Figs. 4 and 9) in a vertical wall 64 of the end-frame 60. Each opening is normally closed by a gate 66 pivoted by a spindle 68 at the outer side of the wall 64. Fast upon the spindle is an arm 70 joined by a link 72 to an arm 74 on a shaft 76, journaled in a bracket 77 above the gate. The shaft also has fast upon it a pinion 78 with which meshes a vertically movable rack 80 guided at the outer side of the bracket. The rack is attached to the lower extremity of the plunger of a solenoid 82 mounted upon the bracket. The two solenoids, of the gates toward which the setting-up sections S and s deliver, are connected in a circuit illustrated in Fig. 6 of the drawings. In series with each solenoid is a contact device 84 associated with the supporting surface 52 of the opposite setting-up section; that is, the solenoid of section S is joined directly to the contact device of section s, and that of section s to the contact device of section S. These two circuits are united in parallel to some source 86 of electric current and to a contact device 88. The contact device 88 is closed periodically by a cam 90 (Fig. 9), this being at a time when either a box or a cover is beneath the corresponding contact device 84. The cam may be upon a constantly rotating shaft 92 included in the setting-up machine. Each contact device 84 is normally closed, but is opened by the box-parts passing beneath it (Fig. 7). It will be seen that during a testing period, at which time both a box and a cover should have arrived upon the plates 58, both solenoid-circuits will be closed at 88, but will have been opened at 84 by the properly delivered box-parts. If, however, either of the setting-up sections has failed to make its delivery, the corresponding contact device 84 will remain closed. There will consequently be completed a circuit for the solenoid of the opposite setting-up section, which will draw up its plunger and through the gearing and other connections lift the gate 66. This uncovers the opening 62, so the pushing fingers 50 will eject from the machine the box-part which is unaccompanied by its companion part. The gate is turned to a position above the spindle 68, where it is held temporarily by a detent 101 pivoted upon the frame and which has entered a notch in the rack 80. A link 103 joins the detent to a lever 105 fulcrumed upon the frame, and held by a tension-spring 107 yieldably in the path of a projection 109 from a sprocket-wheel 148, another purpose of which is hereinafter described. At the end of the testing period, when the contact device 88 is opened by the cam 90, the projection strikes the lever and shifts the detent inwardly (Fig. 9), and its weight, and that of the plunger of the now de-energized solenoid, will return the gate to its closed relation. The apparatus is thereby made ready for the normal delivery of the succeeding pair of box-parts. To dispose of the rejected part, each of the openings 62 is continued by a chute 100, which delivers the discharged part to one of two adjacent horizontal channels 102, 102. Between the two channels runs a chain-conveyor 104, from which pins 106 project oppositely into the channels. The chain operates over sprocket-wheels 108 and may be driven from the shaft 92. By this chain the unmatched box-parts are removed from the machine.

It may be sometimes desirable for the operator to direct matched pairs of box-parts, or complete units, from their normal course through the machine. This may be at times when a number of units less than a full case-lot is to be made. It may be accomplished by causing their discharge through the openings 62. Across the rear of the wall 64, a shaft 93 is journaled, having secured to its center a hand-lever 94 and at its extremities arms 95, 95. These arms extend, respectively, beneath the lower ends of the racks 80. By swinging the hand-lever, the arms may be caused to engage the racks, lifting these and so opening the gates 66 as to allow the passage of the box-parts into the chutes 100. The elements may be maintained in this relation as long as desired by a spring-latch 96 upon the lever, movable into engagement with an opening in a bracket 98 through which the shaft 93 passes.

Assuming that a correctly paired box and cover have arrived upon the respective plates 58 ready for closing, assembling and casing, they are situated upon opposite sides of a member 110 (Fig. 8), which has converging curved guide-surfaces 112 and 114 for the box and cover, respectively. This guide member is an element of the closing section D, and lies beneath a vertical channel formed between a back-wall 116, a front-wall 118 and pairs of rear and front side-walls 120, 122 and 123, 125, respectively, the side-walls 120 and 123 co-operating with the box and the other two walls with the cover. The wall 116 is secured to the end-frame 60, while the wall 118 is carried parallel to the wall 116 by upper and lower screws 124, 124 having pairs of nuts 126, 126, by which the wall 118 may be adjusted toward and from its companion. This is to give the proper spaces for boxes and covers of different widths. The wall 120 at the box-side is attached to the back-wall by inclined slot-and-screw connections 128, by which said wall 120 may be moved in such a direction that there will be a space between it and the opposite wall 122 to correspond to the depth of the box being operated upon. There is also maintained the correct relation of its curved lower extremity 130 to the guide-surface 112, with which it forms a gradually upwardly converging throat. The opposite wall 122 and its curved lower portion 132 are adjustable angularly about an upper pivot 134, joining it to the back-wall, it being retained in place by a slot-and-screw connection 136. This varies the width of the throat between the surfaces at 114 and 132 to correspond to the length of the cover, which is to pass through it. The side-walls 123 and 125 are similarly supported upon the plate 118.

Between the side-walls 120, 122 and 123, 125 are spaces, and rotating vertically through each of these spaces, transversely across the corresponding plate 58, is an arm, that designated as 142 being at the box-side and 144 at the cover-side (Fig. 9). Each arm is secured to a shaft 146, journaled horizontally in the frame and turned through 360° for each closing operation by sprocket-gearing 148, which may receive power from the setting-up machine. As appears in Fig. 8, where the arms are shown in successive positions, the cover-arm 144 acts somewhat in advance of the arm 142 for the box. They come into engagement with the box-parts as the setting-up sections s and S deliver these upon the plates 58, force the inner extremities of said parts against the guide surfaces 114 and 112, respectively, and elevate them beneath the curved wall-surfaces 132 and 130 into the closing channel. Within this channel, through each of the walls 122 and 125, projects the inwardly curved end 151 of a spring retarding and retaining member 150, which is mounted upon its wall for vertical adjustment by a slot-and-screw connection 152. As the upper end of the cover reaches and is retarded by the portion 151 of the spring, when the arm 144 is just leaving the lower end of said cover, the upper end of the box is within the cover and the arm 142 is continuing to raise it. Consequently, the box-end, which has been brought by the relation of the sides of the channel between the side-walls of the cover, will be urged up against the end-wall of said cover to fully enter and be closed by it as the parts are continuously advanced. When the arm 142 has lifted the closed box above the retaining portion of the spring 150 and is leaving it, there contacts with the lower extremity of the box a vertically oscillating arm 156, located at the inner side of the arm 142. This arm 156 receives its motion from the shaft 146 of the arm 142 by way of a crank 158, link 160 and arm 162, the latter being fast upon a horizontal shaft 164 with the arm. At the limit of its upward travel, the arm 156 carries the box with its applied cover out of the closing section D to the upper level of section E, in which the closed boxes are assembled in preparation for introduction into a packing case.

At the beginning of section E, each box-unit is between side-walls 168, 168, which hold the box-parts against separation and which are adjustable toward and from each other upon the frame by slot-and-screw connections 170. As the arm 156 reaches its highest point, as appears in dash-dot lines in Fig. 8, and just before its movement is reversed, the box-unit which it supports is engaged by the vertically extended end 172 of a horizontally oscillating arm 174. This arm 174 is fixed to a vertical spindle 176 arranged to turn in the frame. Upon a short extension 178 from the arm 174 (Fig. 1), a member 180 is pivoted and has passing through a horizontal bore a link 182, which, by virtue of a spring 184 and stop-collars 186, 186, is yieldable in one direction upon the arm-extension. The link 182 is joined to an arm 188 secured to the upper extremity of a vertical shaft 190, turning in the frame and oscillated through bevel-gearing 192 from the shaft 164. The arm 172, 174, by its yieldable contact with the box-unit, carries this from the arm 156, as one of an accumulating series, upon a horizontal plate 194 of section E. Here, it lies, resting upon one end, between the vertical inner surfaces of opposed conveyor-belts 196, 196, running upon pairs of rolls 198, 198 secured to vertical shafts 200 journaled upon the frame. One of the belts engages the bottom of the box, while the other contacts with the cover, the closure of the box thus being maintained. The mountings of one or both pairs of shafts 200 may be adjustable toward and from the other by slot-and-screw connections 202 (Fig. 8), to give the proper space for box-units of different heights. To enable the belts to sufficiently grasp and carry the units forward without marring them, they may be faced with some material 204 having closely placed soft projecting fibers; for example, as sheep-skin with the wool engaging the units. The shafts 200 are rotated to cause the opposed engaging surfaces of the belts to travel in the direction of the arrow (Fig. 1) by bevel-gearing 206 (Fig. 13), which joins them to a horizontal shaft 208 journaled beneath the plate 194. Sprocket-gearing 210 connects the shaft 208 to a shaft 211 (Fig. 10) journaled horizontally upon a raised portion 212 of the frame and driven by a motor 214 (Fig. 12). To prevent yield of the belts away from the box-units, they may be backed by walls 216 (Fig. 1) extending along the inner sides of their opposed runs, and adjustable upon the plate 194 toward and from each other by slot-and-screw connections 218. To take up slack in the belts, the outer runs may be tensioned by rolls 220, each rotatable upon a lever 222 fulcrumed at 224 upon the plate 194 and acted upon by a tension-spring 226, which urges the roll against its belt. The belts 196 preferably travel at a rate greater than the movement of the engaging end 172 of the arm 174. As a result of this, the box-units, as they are advanced by the belts from the arm, are held spaced somewhat from one another in the series. This permits the operator to introduce the fingers readily between adjacent units and remove any one for inspection or other purposes.

Forwarded by the belts 196 in the manner just indicated, the box-units are delivered one-by-one toward a stop-wall 232 (Fig. 10), alined, in the direction of advance, with a plate 230 which is forwardly and downwardly inclined from the horizontal, while the wall 232 is correspondingly inclined from the vertical for a purpose which will appear in connection with the description of section F of the apparatus. The wall may be adjusted in the direction of delivery of the box-units to correspond to their depth or height by slot-and-screw connections 233 to the frame. The belts 196, 196 do not extend to the plate 230, thereby avoiding interference with the next transfer, which occurs transversely of said belts. To ensure the positive arrival of each unit against the wall 232, the lower and upper ends of said unit are, respectively, engaged by rotatable rolls 234 and 236. Each roll may be surfaced with sponge-rubber 238 protected against abrasion by a covering of leather, to give better engagement with the units. The roll 234 operates through a slot in the plate 194 and is driven by sprocket-gearing 240 from the shaft 208. The shaft 241 of the upper roll 236 is rotatable in an arm 242, pivoted about a horizontal shaft 244 journaled in a bracket 245 mounted for vertical adjustment at the underside of the frame-portion 212. The normal position of this roll 236 may be varied by a stop-screw 246 threaded through a rearward extension of the arm 242 and bearing against the bracket. The roll 236 is driven by sprocket-gearing 248 between the shafts 208 and 244 and sprocket-gearing 250 between the shafts 244 and 241. To the left of its path of advance, each box-unit is retained by vertically spaced narrow walls 252, 252. The support 254 of these walls may be adjusted laterally to correspond to the adjustment of the corresponding belt 196 by slot-and-screw connections 156. At the right, opposite the beginning of the plate 230, the units are temporarily held in correct alinement by a row of pins 258 rising through slots in the plate 194 (Figs. 1, 2 and 3). These pins are mounted to yield when a transferring force is applied to the opposite side of the units, they being held in normally upright relation by torsion-springs 260 acting upon a horizontal spindle 262 turning beneath the plate and by which the pins are carried.

From its position delivered against the wall 232, each box-unit is transferred over a plate 264, divided to straddle one of the pins 258 and inclined downwardly toward the rear of the machine and toward the advancing box (Fig. 2). This tilts the unit forwardly to bring it into the angle of the plate 230 by which it is now received, traveling in a direction at right-angles to its preceding advance. This movement is effected by a pair of upper and lower members 266, which are reciprocated above and between the spaced walls 252 (Figs. 1, 10 and 13) upon the arrival of each box-unit in position for assembling in a row *h*. Each member is adjustably mounted by a slot-and-screw connection 268 upon the inner extremity of a rack-bar 270 guided to move horizontally in the frame. An end-surface 272 upon the member 266 is arranged for engagement with the unit to be transferred, while a surface 274 at right-angles thereto retains the next unit of the series from interfering with the transfer. With each rack 270 meshes a gear 278 fast upon a shaft 280, journaled vertically in the frame. There is also secured upon the shaft above the frame-portion 212, a pinion 282 (Figs. 10 and 12), having meshing with it a rack 284 guided for horizontal reciprocation and joined by a link 286 to a crank 288 attached to one extremity of a horizontally journaled shaft 290. A pair of gears 291, 292, respectively normally loose upon a shaft 290 and upon a parallel shaft 294, a pinion 293 turning with the gear 292 and meshing with a gear 296 loose upon a parallel shaft 298, an idle pinion 299 and a meshing pinion 300 upon the motor-shaft 211, furnish a chain of elements by which any one of the shafts 290, 294 and 298 may be driven selectively from the constantly operated motor-shaft. Each of these driven shafts may be joined to the rotating gear upon it by a single-rotation clutch mechanism 302. Considering now the shaft 290 by which the racks 270 of the transfer members 266 are reciprocated, the engagement of its clutch is effected by movement of the plunger of a solenoid 304. This solenoid is in circuit with a contact device or detector 306 (Fig. 10), the movable element of which projects through the stop-wall 232. By a slot-and-screw connection 307 to its support, the location of the contact device may be changed toward or from the delivered box-units to alter the time of its actuation. Other detectors in the machine may be similarly adjustable. When a unit has been urged against this contact device 306 by the rolls 234 and 236, the circuit through the solenoid 304 is closed, and the associated clutch 302 is engaged, turning the shaft 290 through 360°. By the connecting elements previously indicated, the members 266 are reciprocated to move the leading unit of the delivered series of boxes from the stop-wall over the pins 258, which are displaced against their springs 260.

In this movement, the box-unit is carried beneath an upper retaining bar 308 (Fig. 13), which is mounted for substantially vertical adjustment upon brackets 312 depending from the frame-portion 212, each bracket being in sections adjustable relatively by solt-and-screw connections 310. The bar is transversely inclined, so it parallels the plates 230 and 264 and preferably has a yieldable work-engaging surface, which may be furnished by sponge rubber 314 with a protective covering. As each box-unit is shifted from the forward end of the delivered series, the bar 308, by engagement with its cover, holds it upon the supporting surfaces in its forwardly inclined position ready to be advanced another step along the plate 230 by the contact of the succeeding unit, as this is acted upon by the members 266. That the covers C, which are at the front of the advancing units, shall remain fully seated upon the boxes B in the first step of the transverse travel of the units and during the retraction of the members 266, said units pass over vertical abutment-plates 316 situated side by side just beyond the pins 258 (Fig. 2). These plates are shown as carried by a crossbar 318 at the upper end of a spindle 320, guided for vertical movement beneath the plate 264 and held normally raised by an expansion-spring 322. The upper edges 324 of the plates are inclined downwardly to the left to facilitate the passage of the box-units over them as the spring 322 is compressed, and the edges are inclined from one end of the series to the other to correspond to the inclination of the plates 230 and 264. The reciprocation of the transferring members 266 takes the units just past the vertical forward edges 326 of the plates 316. By these edges the lower margin of each box-bottom will be retained until advanced by the succeeding unit while the cover will be held against displacement by the bar 308 engaging its upper edge. The parts of each preceding box-unit will be held together by the one following it in the row.

As the row of closed boxes is being assembled upon the plate 230, they travel at their rear sides along a transferring device, the unit-engaging portions of which consist of two vertically spaced horizontal bars 330, 330 (Figs. 10, 12 and 13). The bars are attached to depending portions 332 of two rack-bars 334, which are guided for reciprocation upon the underside of the frame-portion 212 in a direction parallel to the transverse inclination of the plate 230. With each rack meshes a gear 336 fast upon a horizontal shaft 338, journaled above the frame-portion 212. Upon this shaft is also secured a pinion 340 engaged by a rack-bar 342 guided above the frame. To the rack-bar 342 is joined a crank 344 secured to the end of the shaft 294, which carries the gear 292 and pinion 293 included in the chain of elements constantly driven by the motor 214. As may be seen in Figs. 1 and 13, when a complete row of box-units has been assembled along the bars 330 upon the plate 230, the leading unit is urged against an electrical contact device or detector 350. When this is actuated, it completes a circuit through a solenoid 352 (Fig. 12). The clutch 302 of the shaft 294 is thereby engaged for a single rotation, so the racks 334 are reciprocated to carry the assembled row of box-units from the plate 264 above the casing-section F. In this movement, the row of boxes passes between and in contact at their opposite extremities with a stationary vertical wall 354 and a movable wall made up of a series of spaced sections 356. The inner of these sections carries the contact device 350. As may be seen in Fig. 10, both walls are inclined downwardly and forwardly at an angle corresponding to that of the plate 230. Each wall-section 356 is supported upon a vertical bar 358 rising from a horizontal carrier-arm 360. This carrier-arm at the outer end is guided to slide upon a horizontal transverse bar 362 and, at the opposite end, upon a similar bar 364. Each wall-section is faced at 365 with some yieldable material, similarly to the elements 234, 236 and 308. Thus, as successive rows of box-units are advanced between the opposite walls, the yield of the facing will permit their movement by the bars 330 and still hold them against downward displacement by gravity.

The arm 360 with the wall-sections 356 may be positioned differently upon the guide-bars by a rotatable shaft or rod 367, threaded to engage a nut 368 attached to the guiding portion 370 of the arm 360 sliding upon the bar 362 (Fig. 21). This movement of the wall-sections is produced by actuating mechanism H (Figs. 21 to 25) under the control of testing or measuring mechanism I (Figs. 16 to 19, 27 and 30 to 32). By this mechanism I, the length of each case P horizontally is measured to determine the position to which the sectional wall is to be carried by its actuating mechanism, so there may be supported rows h made up of different numbers of box-units, as, for example, three, four or six, as may be seen in Fig. 42 of the drawings. Since the contact device 350 is mounted upon one of the wall-sections to move with it, the mechanism I also controls the time or period of operation of the bars 330. Therefore, when the box-units which have arrived upon the plate 230 correspond in number to the length of the case to be packed, the advancing movement of the bars is produced, as determined by the wall-adjustment. The testing mechanism I has associated with it mechanism J (Fig. 27) for testing or measuring the width of the cases, which may be such as to receive either two or three rows h which go to make up a layer i. The mechanism J determines the time at which the action of the rows, as they are carried forward successively by the bars 330, causes the operation of means by which the chosen number of rows are deposited in a waiting case. The portion J of the testing mechanism will first be described, and the mechanism I, peculiar to length-testing and adjustment of the wall-sections 356, taken up later.

Preparatory to this, considering the means by which the cases P are positioned for testing and thereafter carried into the casing section F of the machine, referring to Figs. 1, 14, 26 to 29, 31, 33 and 39 of the drawings, there extends laterally from the forward portion of the main frame a low frame 376, upon which are arranged conveyors 378 and 380 horizontally alined with each other. Upon the conveyor 378 cases are temporarily held for testing, after which they are delivered to elevator mechanism K in the casing section F, where they rest upon both the conveyors 378 and 380. The elevator raises the cases from the conveyors to different levels, depending upon whether the depth of the case is such that it is to receive one or two layers of box-units. The conveyors are each shown as furnished by three endless belts situated side by side, and operating over spaced sets of rolls 382 and 384, respectively, fast upon pairs of shafts 386 and 388 journaled transversely of the frame 376. The conveyors are constantly driven from a motor 390 through sprocket-gearing 392 for the conveyor 378, this being continued to the conveyor 380 by like gearing 394. The cases are placed upon the conveyor 378 at the right of the machine between a fixed guide-wall 396 at the inner side (Fig. 33) and a guide-wall 398 at the opposite side adjustably mounted at 400, so the walls may be correctly spaced for cases of different widths.

Pairs of stop devices 402 and 404 are associated with the conveyor 378, these being projected above or withdrawn below the belts. The devices 402 may hold back upon the conveyor 378 for successive release a line of waiting cases, while the devices 404 retain a single case in position for testing by the mechanisms I and J. Herein, the stop devices appear as vertical pins pivoted to the approximately horizontal arms 406 of compound bell-crank-levers $l^2$ and $l^3$, each fulcrumed by a spindle 408 upon the underside of a platform 410 by which the upper run of the belt 378 is supported. The pins of each lever are held normally above the table by a torsion-spring 411 (Fig. 33) surrounding the spindle. Flanges 412 upon the pins limit their upward movement by contact with the underside of the platform. The depending arms 414 of the two levers $l^2$ and $l^3$ are joined by a link 416 (Figs. 28 and 29), this being pivoted to the lever $l^3$ and having a shoulder 418 engaging the forward side of the arm 414 of lever $l^2$ between a bifurcation of which it passes. A tension-spring 420 draws the link against an adjustable stop-screw 422, threaded into a projection from the arm 414. A bar 424 at one extremity co-operates in the same manner with the lever $l^3$, and at its opposite end is held by a tension-spring 426 in the path of a cam-projection 428 upon the elevator K (Figs. 28 and 40). When the elevator returns to its lowermost or case-receiving position after a preceding case-filling operation, the cam shifts the bar to the left (Fig. 28), the shoulder 418 of the bar, engaging the arm 414 of lever $l^3$, rocks said lever clockwise. This movement is communicated by the link 416 to the lever $l^2$, causing this to rock in the same direction. This movement of the two levers lowers the stop-pins 402 and 404 below the supporting surface of the platform 410, the former pins acting somewhat in advance of the latter. This causes the release of the cases held by the conveyors 378 and 380 against the stop-pins. As the levers $l^2$ and $l^3$ were turned during the case-releasing movement, the lower extremities of the screws 422 were brought against the upper sides of the link 416 and the bar 424, forcing these down against the tension of the springs 420. This lowers the link and bar so the shoulders 418 free the levers, allowing the springs 411 to return the pins to their raised case-arresting relation. The springs 420 maintain the link and bar against the screws 422, and, when freed by the cam 428, the bar under the influence of the spring 426 is returned to its initial position with its shoulder 418 behind the arm 414 of lever $l^3$. This lever, when turned by its spring 411, similarly locates the shoulder of the link 416.

As the cases P are released at the entering and testing stations by the stop-pins 402 and 404, the conveyor 378 at once urges them against the peripheries of respective pairs of rolls 432, 432 and 434, 434. These rolls are fast upon horizontal shafts 436, 436 journaled in the frame 376, and their upper portions project through slots in the platform 410, continuously rotating clockwise, as viewed in Fig. 28 of the drawings. This rotation is effected by sprocket-gearing 438 (Fig. 33) between the motor 390 and the shaft of the rolls 434, while like gearing 440 joins the shafts of the two pairs of rolls. These rolls present to the cases inclined surfaces traveling upwardly and forwardly, which receive and support the front edges of said cases above the upper extremities of the stop-pins. Thereby are provided spaces into which the pins are free to rise as the cases advance. Over these rolls the cases are carried, inclined first to the left and then to the right, finally resuming their vertical positions upon the conveyor.

Returning to the means by which the box-units are advanced in the assembling section E, it must be determined how many times the bars 330 (Figs. 1, 10 and 26) are to be reciprocated before the rows h, which are held in a layer i between the opposite walls 354 and 356, are deposited in the case P waiting in section F upon the elevator K. This will depend upon whether the case is of a size adapted to contain two horizonal rows of box-units, as shown at a and c in Fig. 42, or three rows, as at b, d and e in that figure. The measuring or testing mechanisms I, J for this purpose are set in motion intermittently by a contact device 442 (Fig. 40), closure of which is produced by the mechanism controlling the elevator K, so the testing action is properly synchronized with the movement of said elevator and the associated mechanisms. The manner of operation of the contact device 442 is hereinafter developed in detail in connection with the control of the elevator. Said contact device completes a circuit through a solenoid 448 (Figs. 27, 30 and 33) to cause the engagement of clutch mechanism 450. The driving member of the clutch is carried by a horizontal shaft 452, and is rotated continuously from the motor 390 through the chain of the sprocket-gearing 438, already referred to as actuating the rolls 434. The driven clutch member is fast upon the shaft 452, which is connected by bevel-gearing 454 to a horizontal shaft 456. At the end of the shaft 456 opposite the bevel-gearing is secured a crank 458, which is joined adjustably at 460 to a rod 462. At its opposite end, the rod is articulated to an arm 464 carried loosely upon a horizontal shaft 466, journaled parallel to the conveyor 378 outside the guide-wall 398. The hub of the arm 464 has a projection, as shown in Fig. 32, which is normally forced yieldably against a surface 468 upon a projection from a collar 470 fixed to the shaft 466. This contact is caused by a torsion-spring 472, joined to the arm-hub and to a collar 474 secured to the shaft. When the solenoid 448 causes the engagement of the clutch 450, the just-indicated connections, which said clutch drives, produce a single oscillation of the shaft 466. The testing mechanism I is carried upon the shaft by two arms 476, 476 and, by this shaft-movement transmitted through the spring 472, is swung into length-testing engagement with the side of the case P which is now supported upon the conveyor 378 against the stops 404. The mechanism J, which is under the control of mechanism I, includes a cam 478 (Figs. 20 and 27), and this is turned through different angular degrees, depending upon the extent of oscillation of the mechanism I, determined by whether the case is of a width adapted to receive two or three rows of box-units. When this cam is rotated through a sufficient angle, it actuates a contact device 480. If the case P is of a width to receive a layer of box-units in which there are three rows h, as in the case-arrangements b, d and e of Fig. 42, the testing mechanism I is stopped by engagement with its sidewall and acts as is hereinafter described. The operating connections continue the oscillation of the arm 464, but, since the arms 476 and the shaft 466 are held against oscillation by the device I, the spring 472 yields, the projection from the hub of the arm 464 leaving the surface 468 of the collar 470 and turning in a space 482 in this collar (Fig. 32). In this limited movement, the cam has no effect upon the contact device 480. If, however, the case is to receive layers of box-units containing two rows (a and c, Fig. 42), the inward movement of the testing mechanism I continues through a distance equal to the width of such unit. The spring 472, without flexing, turns the cam 478 of the testing mechanism J sufficiently to actuate the contact device 480. By the non-closure or closure of a circuit thus controlled, for mechanism described below, there is determined the time or period of operation of means for lowering into a case P, waiting upon the elevator K at section F, a layer i of box-units made up of either two or three rows h, which have been advanced between the walls 354 and 356 by the bars 330.

The case-packing mechanism is best illustrated in Figs. 10 and 12 of the drawings, while the controlling means appears in Figs. 1 and 11. Referring to Fig. 1, there is mounted at the side of the section F, opposite that from which the case P enters and is received by the elevator K, a horizontal spindle 488, this lying at the level along which the rows h of box-units are delivered by the bars 330. To the spindle are attached two contact-arms 490 and 492, situated at the forward extremes of travel of three rows and two rows of box-units, respectively. A helical spring 494, surrounding the spindle and acting both by torsion and expansion, holds the arm 490 normally up and slightly inward in the direction of approach of the rows h, ready to be struck and actuated by the forward row of a three-row layer of box-units (Fig. 11). The arm 492 is also held inward, but is at one side of the path of the advancing rows. In each instance, the portion 491 of the arm, which is to receive contact of projecting flaps of the case, is carried upwardly and outwardly, so said flaps will be deflected outside the portions 491 to avoid interference (Fig. 10). An arm 495 upon the spindle is joined by a link 496 to the plunger of a solenoid 498, which is in a circuit with the contact device 480 (Figs. 20 and 27). When said contact device remains open, because the cam 478 of mechanism J upon the testing of the three-row case P does not turn sufficiently to actuate it, the solenoid 498 is unenergized, and the contact-arm 490 is in the raised position of Fig. 11 and effective, while the arm 492 is lowered and ineffective. But, when the contact device 480 is closed by the cam upon testing a two-row case, the solenoid is energized, so raising the arm 492 that it will be actuated by a two-row layer. After the contact at 480 is opened by the return of the testing mechanism I to normal, the elevation of the arm 492 is temporarily maintained by a latch 499 mounted upon the frame. The engaging end of the latch is urged by an expansion-spring 501 into the path of a projection 502 from the arm 495. The arm 492 therefore remains raised until it has been moved bodily with the spindle by contact of the two-row layer. This separates the projection laterally from the latch, permitting the arm 492 to assume its initial position. Upon axial movement of the spindle 488 by either the three-row layer or two-row layer of box-units, contacting, respectively, with the arms 490 and 492, its rear extremity engages a contact device 500 to complete a circuit by which is governed the reciprocation of the case-loading means described below. The time at which this occurs will thus depend upon whether the bars 330 have delivered three rows or two rows of box-units and will have been determined by the test of the case P made by the mechanisms I, J.

Considering Figs. 10 and 12 of the drawings, there are guided for vertical reciprocation in the frame-portion 212, two rack-bars 504, 504. To the lower ends of these bars is attached a horizontal frame 506 carrying three transverse bars 508. These bars are so located that they lie, respectively, above the corresponding rows h of box-units in a layer i when this is assembled between the walls 354 and 356 ready to be deposited in the waiting case P. With each rack-bar meshes a gear 510, the two gears being fast upon a horizontal shaft 512. The shaft has fixed upon it a pinion 514, with which meshes a rack 516 connected to a crank 518 secured to the end of the shaft 298. The clutch 302 of this shaft is actuated by a solenoid 520, and the circuit of this solenoid is governed by the contact device 500 (Fig. 1). If the case which is to be filled, when measured at the mechanisms I and J, is found to be of a size to contain three rows $h$ of box-units in each of its layers $i$, the contact device 500 will not be closed by the spindle 488 until the maximum number of three rows has been delivered by the bars 339 against the arm 490. Then, the solenoid 520 will be energized, the shaft 298 turned through 360° by the constantly rotating shaft 211, and the rack-bars 504 reciprocated once to cause the bars 508 to force the layer $i$ into the case. If, instead, the size of the case is such that it contains but two rows of box-units, the mechanisms I, J will have produced the energization of the solenoid 498; the contact-arm 492 will have been lifted to its active position, so the circuit of the solenoid 520 will be completed through said arm by the actuation of the contact device 500; and when two rows $h$ have arrived above the case they will be deposited therein by the movement of the bars 508. Whether the rows are two or three in number, the downward inclination of the row-supporting plate 230, together with the corresponding arrangement of the walls 354 and 356, will ensure, as appears in dotted lines in Fig. 10, that before the depositing bars 508 operate, the lower extremities of the box-units will have entered between the case-walls, so the units cannot strike the tops of said walls when the bars act upon them.

After the case P has been tested by the mechanisms I and J and released by the lowering of the stops 404, it is carried by the conveyors 378 and 380 into the casing-section F, and is received by the elevator K. This lifts the case to the level at which the box-units are to be received and lowers the filled case for removal. This portion of the apparatus may best be seen in Figs. 14, 15, 39 and 40. Near the inner left corner of section F is secured in the machine-frame a square upright 530. Guided upon this upright is a carrier-sleeve 532, upon the upper and lower extremities of which are rotatable two sets of rolls 534, each set having four rolls contacting with the sides of the upright. Extending rearwardly from the sleeve along the conveyors is an arm 536, guided at its opposite end by a vertical bar 538 fixed in the frame. Projecting at right angles from the arm 536 is an elevator-platform having a main portion 540, from the opposite sides of which are pairs of lateral extensions 542, 542. These extensions are spaced from each other, so the central conveyor-belts 378, 380 may run between them. Joined to the elevator is a cable 544 extending upwardly over a sheave 546, rotatable upon the frame, and about a drum geared to the shaft of a reversing electric motor 548.

As a case arrives at its fully advanced position upon the elevator, the conveyors force it against a member 550 (Fig. 14). This member has a vertical contact-surface rising above the elevator-platform and the conveyor 380, and is pivoted at 552 (Fig. 39) upon a slide 554 guided for horizontal reciprocation upon the frame. The contact member 550 is held normally raised by a torsion-spring 556 surrounding its pivot, while the slide is urged inwardly, for engagement by the case of the member 550, by a tension-spring 558 joining it to the frame. Horizontally alined with the slide at the end opposite the contact member is a pin 560, projecting from an arm 562 secured to the spindle of a circuit-controlling switch 564. As is shown in Fig. 40, conductors from the terminals of the switch lead to the terminals of the motor 548, which, upon the receipt of current, will cause rotation of the motor to raise the elevator K. With the contact member 550 and slide 554 shifted to close the switch, the case is stopped in its final position upon the elevator, and when said elevator rises and the case leaves the member, this is restored to its initial position by the spring 558. The switch-terminals remain closed until the arm 562 is restored to its original position to stop the elevator at the desired level, as will later appear. When the elevator descends with the filled case, it rests upon the member 550. This is depressed against the force of its spring 556, so interference with the removal of the case is avoided.

Extending along the elevator at its inner or left side, considering the direction of advance of the case, is a vertical wall 566 secured to the platform-portion 540 by slot-and-screw connections 568 (Fig. 39). When the case is against the wall, it is properly located transversely of its path for the elements which are to act upon it. To force the case against the wall, and there maintain it for the packing operation, there is pivoted at 570 upon the outer side of the elevator a bell-crank-lever 572 (Figs. 14 and 15), a long upwardly inclined arm of which has at its top a laterally extending case-engaging portion 574. Another arm of the lever 572 is connected by a tension-spring 576 to the frame, this urging the portion 574 toward the elevator and a roll 578 upon another arm downwardly. Contact of this roll with an actuating surface 580 upon the frame, when the elevator is lowered, holds the lever-portion 574 clear of said elevator, away from the case upon it. But as the elevator and case rise after closure of the motor-circuit at the switch 564, the lever-roll leaves the surface 580, allowing the spring 576 to force the lever-portion 574 against the case and this against the wall 566. Thus, the case will be located properly and held, while it is being filled and until the elevator descends to the normal level. At this time, the surface 580 is again engaged by the roll 578, forcing the upper arm of the lever 572 outwardly to release the case for removal by the conveyor 380.

As the case is raised by the elevator, its dimensions determine the performance of two operations. First, by the length of the case, depending upon the number of box-units included in the rows $h$, there is controlled which of the laps $k$ and $l$ at the top of the case (Fig. 42) shall be folded inwardly and downwardly against the side walls to be there retained by the received box-units, or shall be turned outwardly and downwardly to avoid interference by their contact with adjacent parts of the machine. Second, the height of the case, as for one or two layers $i$ of box-units, governs the level at which the elevator K is stopped for the packing operation. As to the first of these measurement-controls, the turning out of the laps is done first at a lower level, while the turning in of the laps is effected at a higher level by another mechanism. The manner in which the laps are turned in varies with different lengths of case to give the best exposure of the labels for the contained boxes, so the character of the contents may readily be seen without opening the case. Partial closure of the cases for this purpose is a common practice. The best display of box-labels, when the laps are finally positioned, is obtained with the laps $k$ of the cases in which there are six box-units in a row $h$, turned in. When there are fewer in the row, the lap $l$ is similarly turned. These laps which are to be turned in do not produce interference, and need not be acted upon at the lower level, so the testing of the case-length is applied only to determining which of the laps $k$ and $l$ is not to be turned in and turning out the other of these laps. An inspection of the various forms of cases appearing in Fig. 42 will show that the turn-out mechanism to be described will act only upon the laps $k$ of cases $b$ and $e$, and upon the laps $l$ of cases $a$, $c$ and $d$. Further, at the lower level, there are turned out the laps $n$ upon all the cases without any test of dimensions. The laps $m$ are not acted upon, they neither interfering with machine elements, nor affecting the desired view of the box-labels after the cases have been closed.

The turn-out mechanism is illustrated in Figs. 10, 14, 15 and 34 to 38, inclusive. Pivoted upon the machine-frame beside the path of the elevator K, with their lap-engaging portions just above the free ends of the laps $k$ and $l$ for the highest or two-layer-case, are fingers 590 and 592. Two of these fingers, 590, are shown upon the side of lap $k$ and two, 592, upon the side of lap $l$. Each finger is formed of relatively thin sheet-metal attached to a pivoted mounting 594, with its shank inclined upwardly and inwardly, it normally lying above the corresponding case-lap $k$ or $l$. Its end 596 is inclined inwardly and downwardly. To a projection from each mounting 594, a sleeve 597 is pivoted, this surrounding a rod 598. An expansion-spring 600 encircling each rod holds the sleeve yieldably against a nut and lock-nut 602, threaded upon the upper extremity of the rod, the spring abutting at the bottom against a collar 604 secured to the rod. The rods of the fingers 590 are articulated to arms 606 fast upon the opposite extremities of a shaft 608 journaled in the frame below the elevator (Figs. 14 and 36). A torsion-spring 610 about the shaft urges the fingers 590 in above the case-laps $k$. An arm 614 extends from the shaft 608, it being joined to a piston 616 movable in a cylinder 618. The fingers 592 are secured to a shaft 593 journaled above the elevator, they being urged normally forward by a torsion-spring 612 acting upon the shaft. Through an arm 599 and connections similar to the sleeve 597 and spring 600 of the fingers 590, the shaft is joined by a rod 598 to the piston 620 of a cylinder 622.

The finger-actuating cylinders 618 and 622 are included in a fluid-pressure-system Q, best illustrated as a whole in Fig. 36, with detail-views of the valves in Figs. 34, 35, 37 and 38. In Fig. 37 appears a valve V governing the production of vacuum in the actuating cylinders 618 and 622 through ports in a cylinder 624, opening into conduits 626 and 628, respectively. The cylinder is arranged to move vertically in ways 630 in the frame, portions of the conduits being flexible to permit this. A conduit 632 joins the valve-cylinder to unillustrated means for producing a vacuum. Within the valve-cylinder 624 operates a plunger 634, having a reduced central portion which normally allows vacuum to be created in the conduit 628 of the actuating cylinder 622. The valve-cylinder 624 carries a friction-band 635 embracing the plunger, causing the two to travel together, yet permitting individual movement. Relative movement between the plunger and cylinder will join the conduit 626 of actuating cylinder 618 to vacuum. A link 636 unites the plunger to an outward extension from a feeler 638 pivoted upon the machine-frame at the inner side of the path of the advancing case (Figs. 14 and 15). The location of this feeler along said path is such that for cases of lengths suitable to receive six box-units in a row $h$ (cases $a$, $c$ and $d$), it may contact with the case-wall. If, however, the case is shorter (cases $b$ and $e$), the feeler will move into a space at the rear of the case.

Depending from the bottom of the elevator K is a plate 640 having a cam-edge. This is inclined downwardly and outwardly from the elevator at 642, and downwardly and inwardly at 644, there being an intermediate vertical portion 646 (Figs. 37 and 40). Against the cam-surface 642 normally rests a roll 648, rotatable upon an upwardly extending arm 650, secured to a horizontal shaft 652 turning in the frame and acted upon by a torsion-spring 654 to force the roll against the cam-surfaces (Fig. 36). Also fast upon the shaft is an arm 656 provided with a projection 658 engaging the valve-cylinder 624 to raise and lower it. Below the shaft 652, a shaft 660 is journaled horizontally in the frame, and to this is attached an arm 662 having rotatable upon it a roll 664. This roll normally rests against the cam-surface 646 and is there yieldably held by a torsion-spring 666 acting upon the shaft 660. An arm 668 secured to the shaft 660 carries a roll 669 normally in contact with the lower end of the valve-plunger, which projects below the valve-cylinder. The main conduit 632 of the mechanism Q is connected to a valve-casing 670, in which a plunger 672 is movable (Fig. 14). To the casing, in addition to the conduit 632, a vacuum-conduit 674 is joined, together with a conduit 676 open to the atmosphere. When the elevator K is lowered, an expansion-spring 678 forces the end of the valve-plunger 672 against a vertical surface 680 upon the edge of a cam-plate 682 attached to said elevator (Fig. 40). In this position, the conduit 632 is in a relation corresponding to exhaust, but, as the elevator rises, a downwardly and inwardly inclined surface 684 upon the plate allows the spring 678 to shift the valve-plunger, so the conduit 674 produces a vacuum in the conduit 632 and those connected to it. The cam-plate 682 acts somewhat later in the rise of the elevator than does the cam-plate 640 controlling the main valve V. This order of operation prevents chattering or false movements of the elements of mechanism Q when its valves are being set.

Let it be assumed that one of the cases, having the length of $b$ or $e$, has arrived upon the elevator K, and that this has been started up. Its box-unit-receiving position is as already described. The lap $k$ is to be turned out (Fig. 42). The turn-out fingers 590 and 592 are held normally by their springs 610 and 612 with their shanks in the paths of the upper edges of both the case-laps $k$ and $l$ (Figs. 14 and 15). As the elevator rises, it carries the cam-plate 640 with it, and the action of the surface 642 upon the roll 648 rotates the shaft 652 in such a direction as to lift the valve-cylinder 624 (Fig. 37). Since the case is a short one, there is a space opposite the feeler 638, so it is free to swing in. The friction device 635 can, therefore, raise the plunger 634 with the cylinder, maintaining the normal connection between the suction-conduit 632 and the conduit 628 to cylinder 622 for actuating the fingers 592. When the cam-plate 682 produces suction in the conduit 632 by allowing the valve 672 to join it to the conduit 674, the relation of the passages of valve V causes the drawing down of the piston 620, and through the rod 598 the fingers 592 are carried outwardly to an ineffective position. Since the conduit 626 remains closed when the cylinder and plunger of the valve V move together, vacuum is not applied to the cylinder 618, and the turn-out fingers 590 remain in their normal positions. This relation is represented in full lines in Fig. 15. As the elevator rises, the lap $l$ is consequently unaffected, but the upper edge of the lap $k$ strikes the shanks of the fingers 590 and rides up these into the angle formed between said shanks and the end-portions 596. This forces the fingers outwardly, as appears in dash-lines in Fig. 15, carrying the lap with them, the springs 600 yielding. Thus, said lap is bent outwardly about the crease between it and the case-wall to a sufficient extent to render said crease flaccid. Consequently, the lap will remain at such an angle, that, if it engages any part of the machine as it travels up to its box-unit-receiving position, it will be folded down against the outside of the case without injury. When the elevator descends after the filling of the case, the lap $k$ will be free to resume a more nearly vertical position, ready for folding in to close the case. Were the elevator K to rise without a case upon it, or with a case out of position, a portion of said elevator might strike the fingers 590 occupying their normal inward positions. To guard against this, the elevator-arm 556 has attached to it two vertical inclined strips 690, 690 (Figs. 15 and 40). These are so located, that if the fingers fail to be acted upon by a case-lap, the strips will engage rolls 692 rotatable upon the mounting members 594, swinging the fingers clear of the path of the elevator.

After the cylinder and plunger of the valve V have been actuated by the cam-plate 624, as just indicated, and upward travel of the elevator continues, the cam-surface 644 (Fig. 37) permits the arm 650 to be swung in by its spring 654, lowering the valve-cylinder and plunger together to their initial positions. The feeler 638 is thereby moved out of its testing relation, so it does not engage the rising case. This will prevent disturbance of the valve-setting and also contact between the feeler and case, when the latter descends after receiving the box-units. During this setting of the elements of the valve V, the plunger-controlling arm 668 has gone through an idle movement, the cam-surface 646 leaving the roll 664 and the cam-surface 644 allowing the arm 668 to be depressed. When the elevator is lowered after the case which it carries has been packed and the cam-plate 682 has cut off the vacuum, the cam-surfaces of the plate 640 again act upon the rolls 648 and 664. After the resulting oscillation of the arms 650 and 656, the cylinder 624 is in its initial position, together with the frictionally held plunger 634. The arm 662 raises the arm 668 to its place below the plunger. The finger 592 is now in its normal position, ready for action upon the next case.

If the case to be packed had been one, such as $a$, $c$ or $d$ to receive rows $h$ of six box-units, the valve-cylinder 624 would be, as before, lifted with the plunger 634 by the cam-surface 642 upon ascent of the elevator. But now, the feeler 638, as it is carried in by its connection to the plunger, encounters the side of the case. This is as illustrated in Fig. 14. The plunger is thus held against further upward movement while the cylinder continues to ascend. This causes the conduit 628 to be closed and the conduit 626 joined to the vacuum conduit 632, so the actuating cylinder 618 is made effective to rotate the shaft 608. In a manner similar to that already described for the shorter case, the turn-out fingers 590 are withdrawn from their operating positions, while the fingers 592 are left projecting above the case-lap $l$. This lap is consequently turned out by its engagement with the fingers, while the lap $k$ remains up to be later turned in. In this operation upon the longer case, it will be observed that, when the valve V is ready for resetting, the plunger 634 is projecting below its initial position. As above pointed out, the arm 668 has been allowed to descend, while the cam-surface 644 travels along and leaves the roll 664. When the cam-plate is again lowered by the elevator K and its surface 644 lifts the arm 668, the roll 669 of said arm engages the plunger and raises it to its initial position, at which the conduit 628 is joined to the vacuum-conduit 632 and conduit 626 cut off therefrom.

There is no occasion to turn in either the laps $m$ or $n$, and there is nothing which will interfere with the former, so it is left undisturbed. The lap $n$ might strike the wall-sections 356, so means is provided for turning out these laps of cases of all sizes. This may be accomplished by fingers 700 having the same form as the fingers 590 and 592, and situated at substantially the same level. They are fixed to a shaft 702 (Fig. 10) journaled upon hangers depending from the frame, and are normally held forward into the path of the rising lap $n$ by a torsion-spring 704 surrounding the shaft. This spring forces against one of the hangers a horizontal projection from an arm 706, fast upon the shaft. The action of the fingers 700 in no way differs from that of the fingers 590 and 592, except that they are never removed from their operating relation.

It was earlier stated, that a second condition controlled by a dimension of the case P is the height at which the elevator K is stopped for the reception by the case of the box-units. As represented in Fig. 42, there is to be delivered one layer $i$ of the units to the case $a$, and two layers to the other cases. In the mechanism Q is a valve $v$ (Figs. 34 and 38), having a cylinder 708 and a plunger 710. An arm 712 upon the shaft 652 and an arm 714 upon the shaft 660 act upon the cylinder and plunger, respectively, in a manner similar to the effect of the arms 656 and 668 upon the corresponding elements of the valve V, and between these elements of the valve $v$ is the friction-connection 635. The plunger 710 is joined by a link 716 to a feeler 718, this feeler being pivoted upon the frame in the same manner as the feeler 638, but at a higher level (Fig. 15). This location is such that it may swing in above the elevator, if a one-layer case is to be packed, but be held against this movement by a two-layer case. An upper port in the cylinder is connected to the vacuum-conduit 632, while a conduit 720 joins a lower port to a horizontal cylinder 722 (Fig. 36). A piston 724 operating in the cylinder 722 is linked at 726 to an arm 728, fast upon a vertical sleeve 730 rotatable in the frame.

Splined within the sleeve 730 for vertical reciprocation is a rod 732 (Fig. 40), rotatable in an upper bearing 734 in the frame. A tension-spring 736 acts upon the arm 728 to hold the piston 724 drawn outwardly in its cylinder, and the rod 732 turned to such an angle that an elongated contact-piece 738 fixed to said rod may normally lie in registration with a slot in an operating member 740 attached to the elevator. Figs. 40 and 41 show the elements in the positions which they occupy at the time of stopping the ascent of the elevator, carrying a two-layer case, b, c, d or e. For such a case, the member 740 upon the elevator has engaged the contact-piece 738 upon the rod 732, which contact-piece was across the slot in the member. The rod is thereby lifted, and a collar 742 fast upon it strikes one arm of a bell-crank-lever 744. A second arm of the lever is connected by a link 746 to an arm 748 upon the spindle of the switch 564. This opens the contacts of the switch controlling the motor 548, and by which the rise of the elevator was started upon arrival of a case upon it, as previously described. Except for the fact that the valve v applies a vacuum to a single actuating cylinder 722, instead of to two cylinders, as does the valve V, its action is the same. Initially, the plunger cuts off from the conduit 720 the vacuum created in the conduit 632. Consequently, when the elevator is controlled for a two-layer case, as illustrated in Figs. 40 and 41, the stopping of the inward movement of the feeler 718, when the cam-plate 640 rises, will cause relative movement between said cylinder 708 and plunger 710, applying vacuum to the actuating cylinder 722. This draws in the piston 724, rotating the rod 732 to turn the contact-piece 738 across the slot in the elevator member 740. The elevator is thereby stopped at its lower level by the opening of the switch 564, as has been described. For a one-layer case, when the valve v is acted upon by the cam-plate 640, the inward movement of the feeler 718, unchecked by engagement with the case-wall, would allow the cylinder 708 and plunger 710 to remain in the relation appearing in Figs. 34 and 38. Under these conditions, vacuum would not be applied to the actuating cylinder 722; the rod 732 would not be turned; and the contact-piece 738, remaining in its normal registration with the slot in the elevator member 740, would pass idly through the slot without lifting the rod. When, however, the elevator arrives at the level at which it is to be stopped for a one-layer case, the member 740 strikes a contact-collar 750 secured to the rod. This lifts said rod and opens the circuit of the motor 548 at the switch 564.

Whether the case to be packed is of a height designed to receive one or two of the layers i, as it approaches the stopping position, it is acted upon by two sets of fingers 760, 762 (Figs. 1 and 10), which respectively turn in against the side-walls of the case the laps k and l, depending upon whether or not these laps have already been positioned by the turn-out fingers 590 and 592. Fig. 42 shows that for cases a, c, and d the fingers 760 are to be effective, and for cases b and e the fingers 762. The two sets of fingers are mounted and actuated in the same manner, so but one need be described in detail. As may be seen in Fig. 40, there is fixed to the elevator-stop-rod 732 a lower collar 764 and an upper collar 766. Surrounding the rod between the collars is a sleeve 768, from which projects two lugs 770, 770, separated by an angle of 90°. An expansion-spring 772 holds the sleeve yieldably up against the collar 766. To each of the sleeve-lugs a link 774 is articulated, this, at its opposite extremity, being joined to an arm 776 secured to a shaft 778 journaled in the frame parallel to a wall of a case carried by the elevator K. Also secured to the shaft is an arm 780 linked at 782 to a slide 784, guided for vertical reciprocation in ways 786 carried by the machine-frame. Journaled horizontally in the slide is a lower horizontal shaft 790 and a parallel upper shaft 792, these being geared together at 794. A torsion-spring 796 holds the former shaft with an arm 798, which it carries, in a substantially horizontal position. The sets of turn-in fingers 760 and 762 are attached to the two shafts 792 by mountings 800. These mountings may be attached at different points along the shafts to adapt them to most advantageously operate upon cases of diverse lengths and widths. The fingers are so arranged, that they normally lie at angles inwardly and upwardly inclined. The stop-rod 732 lifts the collar 750 and the spring 772 through the same distance, whether it be acted upon for one- or two-layer cases. In so doing, through the connections to the sleeve 768, it will move up both the slides 784. A roll 802 upon the free end of each of the arms 798 will travel over a cam-plate 804 attached to the frame, rotating the shaft 790 contraclockwise and the shaft 792 clockwise (Fig. 10). The upper edges of the laps k and l, which have not been turned out, will contact with the fingers 760 and 762 as the elevator rises, and be deflected toward the top of the case. The downward and inward rotation of the fingers, produced by the cams 804, will fold the engaged laps into the case and against the inner face of the corresponding wall, the spring 772 yielding to compensate for any excess of movement produced by the rise of the rod 732. Here, the fingers are held as the elevator and case are maintained temporarily in packing position, the box-units being forced down against their inner faces. After the case is filled and the elevator descends, the fingers are freed to resume their normal positions under the influence of the rod 732, which, when released by the elevator member 740, falls by gravity.

There has previously been described the deposit of the layers i of box-units in the raised case by the vertical reciprocation of the bars 508, this occurring once for a one-layer case supported by the elevator K at the higher level, and twice for a two-layer case at the lower level. The elevator must, of course, be held for different lengths of time for this filling operation, before its return to the normal lowered position is initiated. This interval may be governed by the driving mechanism through which the bars are reciprocated. Referring to Figs. 12 and 40, the driving shaft 298 has fast upon it a pinion 810, with which meshes a gear 812 rotatable upon a stub-shaft 814 carried by the frame-portion 212. For each complete reciprocation of the bars 508, the pinion 810 makes a full turn, while the gear 812 rotates through 180°. Projecting horizontally from the gear are two pins 816 and 818 separated by 180°, the pin 818 being the shorter of the two. Mounted upon the frame at the pin-side of the gear is a normally open switch 820, having an actuating projection 822 just at the rear of the pin 816 or 818, which has stopped adjacent to it after the packing of one or two layers i in a case has been completed. The switch is carried by an arm 824, pivoted upon a bracket 826 secured to the frame, and so held by an expansion-spring 828 that it may receive contact of the pin 816, but is out of the path of the pin 818. The spring surrounds a piston 830 movable in a cylinder 832, supported upon the bracket and connected by a conduit 834 to a valve-cylinder 836. The application of vacuum to the conduit 834 created through a conduit 838 is controlled by a valve-plunger 840, movable in the cylinder. The valve is normally closed by an expansion-spring 842, as appears in Fig. 40, but may be opened to create a vacuum in the cylinder by engagement with the projecting end of the plunger. Closure of the switch 820 energizes a solenoid 844, the plunger 846 of which is linked to a lever 848 secured to the spindle of a switch 850, which is included in the circuit of reversing winding of the elevator-motor 548.

In Fig. 40, the actuating projection of the switch 820 is shown positioned for a two-layer case, it being held by the spring 828 outwardly where the projection 822 will receive contact of the pin 816 only. As the gear 812 turns during the reciprocation of the case-packing bars 508, the pin 818 will travel idly past the switch-projection, as the first layer $i$ is deposited. When the pin 816 reaches the projection after the packing of the second layer, it will strike said projection and thereby close the contacts of the switch, and then allow them to open, coming to rest in the position illustrated. During this closure, the solenoid 844 is energized, actuating the switch 850 to cause the motor 548 to turn reversely and permit the elevator to descend. The switch 850 remains closed until the elevator approaches its normal or case-receiving level. Then, a collar 852 on a vertical rod 854, guided for reciprocation in the frame, is engaged by a projection 856 from the elevator. This rod 854 was lifted from a supporting spring 858, by contact of the inner end of the switch-lever 848 with a collar 860 upon the rod, and is held when the switch was closed. The lowering of the rod 854 by the projection 856 acts upon the lever 848 to open the switch, stopping the reverse rotation of the motor, so the elevator comes to rest at its case-receiving level.

Were a one-layer case being packed, the elevator would be at its upper level, and the lower extremity of the valve-plunger 840 would have been lifted in its cylinder by a projection 862 upon the elevator, opening the valve. This would apply suction from the conduit 838 to the conduit 834, drawing the piston 830 into its cylinder 832, and shifting the contact-portion 822 of the switch 820 until it lies in the path of the shorter gear-pin 818. The consequent closure of the switch 820 would cause the solenoid 844 to lift the lever 848 to close the motor-reversing switch 850 after the deposit in the case of a single layer $i$, the descent being stopped by the elevator-projection 856 as before, but after a longer downward travel.

Earlier, reference has been made to the starting of the case-measuring mechanisms I and J in operation by a device 442, in circuit with the solenoid 448 (Fig. 27) and governed by the elevator mechanism. In Fig. 40, this device and the solenoid are shown, together with the connecting circuit and the controlling means. The device 442 consists of a switch with its normally open contacts connected to the winding of the solenoid. It has an actuating lever 862 held normally in inactive position by a tension-spring 864. When the lever is turned contraclockwise, a cam-surface 866 thereon closes the switch to energize the solenoid. This operation of the switch is produced by a collar 868, fast to the stop-rod 732 at such a height that it will tilt the lever to close the switch at an interval after the switch 850 has initiated the descent of the elevator. This is to ensure that the case upon said elevator has passed below the wall-portions 356, which are to be adjusted under the control of the mechanism I. When the rod is rising at the time of stopping of the elevator, the collar 868 will tilt the lever 863 idly, but, after the travel of the elevator has been reversed and the rod has been released by the elevator member 740, the inward projection of the lever is struck by the collar. Said lever is thereby turned contraclockwise, this causing its cam-surface 866 to actuate and then release the switch 442, closing the circuit of the solenoid 448 for a sufficient length of time to trip the single-rotation-clutch 450. This causes the testing action of the mechanisms I and J.

The arrangement and effect of the mechanism I will now be described. It will be recalled that this mechanism tests the length of the case P, which has been carried by the conveyors 378 and 380 against the stops 404. It controls the rotation of the threaded rod 367 of the mechanism H (Figs. 1 and 21) and the consequent position of the wall-sections 356, so the distance between said sections and the fixed wall 354 may be made to correspond to the length of the rows $h$ of box-units, which the case is to receive. The rows are thus held properly by engagement with the walls, ready for deposit in the case by the vertical reciprocation of the bars 508. The adjustment of the wall-sections also positions the detector 350 movable with them, so that the bars 230 are actuated to advance a row of boxes between the opposite walls when the number of box-units in a row corresponds to the length of the case measured. Considering first the testing mechanism I and referring to Figs. 16, 17, 18 and 27, the arms 476, 476, which are oscillated when the clutch 450 is engaged under the control of the switch 442, as just described, have journaled in their upper extremities a tubular rock-shaft 880. From each end of the rock-shaft an arm 882 projects, this being joined by a link 884 to an arm 886 formed upon the stationary bearing of the shaft 466. As a result of these connections, as the arms 476 are oscillated by the shaft 466, the shaft 880 is not only swung bodily but is also oscillated about its own axis. About the shaft 880 between the arms 476 are mounted a series of feeler-units, the number and relation of which will depend upon the lengths of cases to be measured. There are shown in Fig. 27, four complete units $r$ and two divided terminal-units $w$ and $t$. Each unit $r$ has a sleeve 888 separated from the shaft by a bushing 889, and from one end of which extends downwardly and inwardly toward the case to be tested a feeler-finger 890 (Fig. 18), opposite to which projects a short divided arm 892. At the end of the sleeve, opposite the finger, is an enlargement 894, in which is rotatable a short horizontal shaft 896 having at its outer extremity a crank 898, the pin 900 of which operates in a block 902 arranged to slide in the divided arm 892 of the adjacent unit. Secured to the end of the shaft 896 opposite the crank 898 is a sector 904, the outer cam-surface of which, when oscillated, will act upon the plunger 906 of a switch 907 carried by the enlargement 894. The connections from this switch pass through the shaft 880 and through an armored cable 909 connected to the shaft. The feeler 890 is held yieldably toward the case P by a tension-spring 910, joining the arm 892 to a stop-rod 912 which is supported between downwardly extending arms 914 fixed to the shaft 880. This movement of the finger is limited by a projection 916 from said finger, contacting with the stop-rod. The partial end-unit $w$ has only the feeler carried by the sleeve 888, while the opposite end-unit $t$ has the switch-portion carried by the enlargement 894. The units $w$ and $t$ are held yieldably to the rod in the same manner as the units $r$.

The case P being tested as to length is shown in Fig. 27, as being one of those appearing in Fig. 42 and holding rows $h$ made up of four box-units. The rear extremity of the case, or that removed from the stops 404, comes between the feelers 890 of the second and third testing units $r$. As the mechanism I is swung toward the case in its testing oscillation governed by the closure of the switch 442, the shaft 880 will be rotated in the arms 476 and the rod 912 swung inwardly, on account of the restraining effect of the links 884. This carries in the feelers, so, if the case is a narrow one, they will be positioned at such an angle that their lower ends will engage it without interference. The three feelers at the right, which contact with the case (Fig. 27), will all yield as permitted by the springs 910, their projections 916 leaving the rod 912, while the remaining feelers at the left are unaffected. It will be evident, that, where the testing units have the same movement about the shaft 880, the relative positions of the arm 892 and the crank 898 will remain the same. This will be true, whether the feelers are shifted by engagement with the case, as those to the right of the case-end, or those to the left, which are not turned about the shaft. But for the case being considered, where the feeler at the right of the case-end is shifted about the shaft and that at the left is not, relative movement between the arm and the crank is produced. The shaft 896 is thereby turned in its mounting 894, and with it the sector 904. The cam-surface of the sector acts upon the switch 907 to close its contacts, controlling through the connected conductors the operation of the actuating mechanism H for the wall-sections 356.

The mechanism H appears in Figs. 1, 10 and 21 to 25, inclusive. In Fig. 21, a portion of the testing mechanism of Fig. 27 is shown diagrammatically, together with the connecting conductors. Included in the mechanism H are five relays, each designated as 920 and five corresponding solenoid stop devices 922. These, taken in pairs from right to left in Fig. 21, co-operate with the respective pairs of testing units $w, r; r, r; r, r; r, r;$ and $r, t$, the contacts of the switches 907 being joined in parallel to the windings of the pairs of relays and solenoids with a source of current connected at 923. The relays are adjustably secured by clamping screws 924 (Fig. 24) in an arcuate slot 926, formed at the rear or inner wall of a case 928 mounted upon the frame of the machine. By the aid of a scale 930 (Fig. 22), the relays may be arranged with the contact-fingers 932 projecting from their armatures spaced from that of the end relay by arcs which are equivalent to the lengths of the various cases to be tested. The contact-finger, upon the energization of any relay, may be brought into engagement with one of two conducting segments 940 and 942, these segments being carried by an insulating disk 944 fast upon the end of a shaft 946, journaled horizontally in the casing 928. Between the ends of the two segments are opposite spaces 948 and 950. The space 950 simply insulates the segments 940 and 942 from each other and is otherwise without effect. The space 948 is of such width and so related, that, in the movement of the segments as the shaft 946 is rotated, some one of the contact-fingers 932 of the relays 920 may be received by it and separated from both segments. These segments 940 and 942 are conductively connected to segments 952 and 954, respectively, at the inner face of the disk 944. Resting upon the segments 952 and 954 are brushes 956 and 958, respectively, which furnish paths determining the direction of current-flow, as will later be described.

The solenoids 922 (Figs. 24 and 25) are carried by individual brackets 960, which may be positioned differently and clamped by screws 962 along a horizontal mounting bar 964, with which is associated a scale 966 (Fig. 21) graduated similarly to the relay-scale 930. The relays and stop devices may be arranged, under the guidance of their scales, to co-operate properly in pairs for the locating of the wall-sections 356. Reciprocating horizontally in a bracket 968 extending from the bar 964 is a rod or tube 970 upon which the scale 966 is formed, this being parallel to said bar and to the wall-actuating rod 367. Clamped upon the rod 970 at intervals corresponding to the solenoids 922 are carriers 972 for vertically movable stop-pins 974, held normally raised by expansion-springs 976 surrounding their upper portions. Each pin lies beneath the laterally extended end 978 of a lever 980 (Fig. 25), fulcrumed upon one of the brackets 960, and at its upper end joined pivotally to a plunger 982 operating within the corresponding solenoid 922.

When energization of any one of the solenoids causes the elevation of its plunger, the extended end of the lever 980 will contact with the pin 974, this being possible in different horizontal positions of the rod 970. The pin is, therefore, lowered against the force of the spring 976 until its lower extremity lies in the path of an element carried by the wall-actuating nut 368 (Fig. 21), which is caused to travel by the rotation of the threaded rod 367. This element may approach the stop-pin from either direction, as the wall-sections 356 are adjusted back and forth, depending upon the length of case P previously tested. It is desired that the stop-pin shall become effective when its vertical axis is in the same position for both directions of approach, so the travel of the wall-sections may cease in the same relation to receive correct supporting engagement of the rows $h$ of box-units forming a layer $i$. Consequently, the element which the stop-pin 974 engages is shown as in the form of a contact-projection 984 from a slide 986 (Fig. 23), guided by slot-and-pin connections 988 upon the flat top of the nut 368. The extent of travel of the slide, as limited by the ends of the slots of the connections 988, is such that the stop-pin engaged by the projection will produce its effect in the same manner, regardless of whether this projection strikes its right or left side. That is, the axis of the pin will be shifted horizontally through the same distance and in the same timing.

Rotation of the rod 367 and travel of the walls 356, which it actuates through the nut 368, are effected by driving mechanism R (Fig. 21). A bevel-gear 996 is constantly driven during the operation of the machine by a shaft 998 (Fig. 24) from a motor 999 (Fig. 1). With opposite sides of the gear 996 mesh bevel-gears 1000 and 1002, both normally loose upon the rod 367. Movable along the rod between the gears 1000 and 1002 is a double clutch member 1004, which is normally in an intermediate neutral position, but which may be carried into active engagement with clutch-portions of either of the gears 1000, 1002. The clutch member is connected by a yoke 1006 to the offset upwardly extending arm 1008 of a bell-crank-lever 1010, fulcrumed upon the frame and to which arm the stop-rod 970 is joined at 1012. Oppositely extending horizontal arms of the lever 1010 are pivotally connected through links 1014 to plungers 1016 in solenoids 1018 and 1019, mounted at opposite sides of the mechanism R. Expansion-springs 1020, supported upon a frame-bracket 1022 at opposite sides of the fulcrum of the lever 1010 and contacting with said lever, yieldably maintain the neutral relation of the clutch member 1004. It allows, however, the shifting of the member, so either of the gears 1000 and 1002 may be driven when the opposite solenoid is energized. The resulting opposite rotation of the rod 367 and travel of the nut 368 and guide 370 for the wall-portions 356, in one direction or the other, shifts a rack 1024 pivoted at one extremity to a depending portion of the guide and held at the underside of the bracket 1022 in mesh with a gear 1026, journaled with a pinion 1028 outside the casing 928. The pinion meshes with a gear 1030 secured to the shaft 946, carrying the insulating disk 944 and its contact-segments 940 and 942. There is thus formed a reducing train, through which the disk is turned during travel of the nut 368 produced by rotation of the rod 367.

There will now be described the manner in which the mechanism H automatically actuates the wall-sections 356 and the detector 350, when it becomes necessary to adjust the space between this and the stationary wall 354, if there is a change in the length of the case P which is to enter the packing section F of the machine. As has already been explained, the mechanism I makes its testing movement toward a case, the advance of which has been arrested by the stop-pins 404. This movement is initiated by the closure of the contact 442 during the descent of the elevator K (Figs. 27 and 40). Depending upon the relation of the rear wall of the case to the testing units $w$, $r$ and $t$, the contacts of a particular one of the switches 907 (Fig. 16) will be closed by the differential movement about the shaft 888 of the units at the opposite sides of the case-end. This will be as determined by the displacement of the feelers 890 upon engagement with the side wall of the case, or the retention against displacement of the feelers which lie beyond said case. As the elements of the relay mechanism are shown in Figs. 21 and 22, the previous case tested was the longest being used, this being one adapted to contain rows $h$ made up of six box-units. This left the contact-finger 932 of the relay at the extreme left, as viewed in Fig. 21, or at the right, as more plainly seen in the reversed aspect of Fig. 22, in the space 948 between the contact-segments 940 and 942. As long as there continues to be cases of the same length advanced for testing, the mechanism H will remain inactive, because, upon the closure of the last switch 907 at the left of the mechanism I, which responds to this case-length, no circuit will be made when the corresponding relay 920 depresses its finger 932. Assume, however, that there comes into testing position such a case as appears in Fig. 27. There will now be closed the third switch 907 from the right of the mechanism I. Referring to Fig. 21, this completes two branch-circuits in parallel supplied with current from the source 923, simultaneously energizing the corresponding third relay 920 and solenoid 922. The relay brings its finger 932 into contact with the segment 942, closing a circuit through the solenoid 1018 of the driving mechanism R. As the plunger of this solenoid is raised, the lever 1010 is tilted contraclockwise and through the gear 1002 rotates the rod 367 in the direction of the arrow. The thread of the rod is right-hand, so the nut 368, guide 370 and arm 360 move the wall-sections 356 toward the stationary wall 354, narrowing the intermediate space to properly receive and support the shorter rows of boxes. The energization of the third solenoid 922 from the right causes its rising plunger to depress the stop-rod 974 (Fig. 24), bringing it into the path of the projection 984 upon the guide-borne slide 986. This slide may have been left by the preceding operation of the mechanism H at either of its extremes of movement. If it is at the right (Fig. 23), it is correctly set for its controlling effect. If the slide is at the left, the engagement of the projection with the pin first shifts said slide until stopped by the connections 998, and then moves the pin and with it the rod 970 to the right. This, through the connection of the rod to the lever 1010, shifts the clutch 1004 to its neutral position to stop the travel of the wall-sections 356. While the movement of the guide 370 has been occurring, the rack 1024 joined to it rotates the reducing gearing 1026, 1028 and 1030 and therefore the shaft 946. The segment 942, through which the circuit for the solenoid 1018 has been made, is turned contraclockwise until the space 948 reaches the contact-finger 932 of the actuated relay 920, deenergizing said solenoid at the time the rod 970, moved by the projection 984, opened the clutch. The mechanism I is retracted from its forward testing position, and the withdrawal of the third feeler-finger 890 from the case allows said finger to resume its normal position and open the switch 907. This breaks the circuit of the energized relay and solenoid, and the mechanisms I and H are ready for testing the next case delivered against the stops 404, and, if the case-length has changed, to reposition the wall-sections 356, together with the detector 350. If, instead of a change from a long case P to one which is shorter, as above considered, the opposite were to occur, the contact-finger 932 of the energized relay 920 would complete the circuit through the segment 940, and the solenoid 1019 would be energized. This would turn the rod 367 in the direction opposite to that just described, so the travel of the nut 368 and the wall-sections 356 would be reversed. Otherwise, the action would be as before.

The operation of the entire apparatus may be outlined as follows. Boxes B and covers C, formed in the respective sections S and $s$ of the setting-up machine, are brought together in section D of the apparatus (Fig. 26), as they are advanced by the rotary arms 142 and 144 over the member 110, the boxes being closed by the covers as they move vertically. By the electric contact devices 82 and 88 (Fig. 5), the absence of either portion of the box-unit is detected, and the unmatched portion discharged through the opening 62 (Fig. 4), the gate 66 of which has been opened under the control of the circuit which the contact devices have completed. Acted upon by the oscillatory arm 156, each complete box-unit is raised to the level of the plate 194 of section E, along which said units are to be arranged in the spaced series $g$ by the oscillatory arm 174 and the opposite belts 196, 196 (Fig. 1). These belts, with the lower and upper rolls 234, 236 (Fig. 10), deliver the box-units successively against the contact device 306, governing the action of the reciprocatory transfer members 266 (Fig. 13). By these members, the box-units are carried at right-angles to the series $g$ upon the plate 230 to form a row $h$. When a row of the desired length has accumulated, the terminal-unit closes the contact device 350, which completes a circuit making active the reciprocatory bars 330. These carry the accumulated row $h$, again at right-angles to the preceding direction of arrival, between the fixed wall 354 and the opposite adjustable wall-sections 356, so related that they hold the row frictionally against falling until a plurality of the rows has been assembled to furnish a layer $i$. The forward row then closes the contact device 500, and by this is produced the vertical reciprocation of bars 508, which deposit the layer in a packing case P waiting upon the elevator K (Fig. 14) in section F of the apparatus.

The apparatus is designed to thus pack box-units in cases which vary both as to length and height, and to deliver automatically the proper number of units in a row $h$ and of rows in a layer $i$ for any case to be utilized. For this purpose the length and height of each case are tested, and the position of the variable wall-sections 356 and the action of the bars 330 and 508 controlled in accordance with such tests. For these tests, the cases P are presented, one-by-one from a series supported upon the conveyor 378 (Fig. 27), to a position at which they are acted upon by the mechanism I with its associated mechanism J. Stops 402 and 404, operated by the cam 428 upon the elevator K, free the terminal-case of the series to be carried into testing relation, and the tested case to be delivered to the elevator K upon which it is packed. The action of the mechanisms I and J is initiated by the closure of the switch 442 (Fig. 40), upon the descent of the elevator after a case-packing operation, this being at a time when the case will not interfere with the adjustment of the wall-sections. The mechanism I, to effect different settings of the switches 907 in the testing units $w$, $r$ and $t$, has feelers 890 (Fig. 16) which may or may not engage the case, depending upon its length, such setting of the switches controlling the actuating mechanism H for the wall-sections (Fig. 21). In this mechanism relays 920 and solenoid-actuated stops 974 are controlled by the switches 907, the former governing the driving mechanism R to determine the direction of movement of the wall-sections and the latter limiting the travel of said sections to correspond to the case-length. This correctly locates the wall-sections to temporarily retain the rows $h$ between them, and, since the contact device 350 is movable with said sections, it will be so positioned that the bars 330 are reciprocated to effect the transfer of the row from the plate 230 when it contains the number of box-units the tested case is to receive. The extent of movement of the mechanism I toward the case is in proportion to the case-width, and the mechanism J, which shares in this movement, is caused to set the arms 490 and 492 (Fig. 11), whereby the contact device 500 is actuated to cause the reciprocation of the layer-depositing bars 508 when the number of rows $h$ has been assembled in a layer $i$ corresponding to the width of the case.

The elevator K, to which the stops 404 release the case P, is started to rise to the box-unit-receiving level upon the arrival of said case on it by the closure of the switch 564 (Figs. 14 and 40) governing the circuit of the elevator-motor 548. The dimensions of the case, tested while upon the elevator, determine two effects: First, depending upon its length, one or the other of the laps $k$ and $l$ (Fig. 42), by which the top of the case is to be partially closed after packing, is turned out to avoid interference with parts of the apparatus as the elevator rises, leaving the other of said two laps to be turned in; and, second, the distance through which the elevator travels is controlled, depending upon the number of layers in the case. As to the former, the feeler 638 (Fig. 15), actuated by the cam 640 upon the elevator (Fig. 37), by testing the length of the case determines whether it is to hold rows $h$ of six box-units or of a less number. If the former is true, parts of the valve V connected to the feeler are shifted relatively, and, when the cam 682 upon the ascending elevator opens the valve 672 (Fig. 14), suction is applied through the valve V to the cylinder 618 in the pneumatic system Q (Fig. 36), the piston of that cylinder being connected to swing out of the path of the lap $k$ the angular fingers 590, which normally project above the case. The valve V leaves the cylinder 622 unaffected, so the fingers 592 remain in place. These fingers 592, engaged by the lap $l$, deflect it outwardly and downwardly. With a short case, the feeler 638 would pass the end idly, and the relation between the parts of the valve V would be unaffected, so the action of the cylinders 618 and 622 is reversed. The normal connection of the valve would withdraw the fingers 592 and leave the fingers 590 effective, turning out the lap $k$ only. Toward the completion of the upward travel of the elevator K, movement of the rod 732, which is lifted to stop it (Fig. 40), is transmitted to the fingers 760, 760 (Fig. 10). These are thus turned down into the case, engaging the lap $k$ or $l$ which was not turned out by the fingers 590 or 592 and holding said lap inside. When the box-units are deposited from between the walls 354 and 356 into the case, the turned-in lap is retained by them, after which the descent of the case upon the elevator leaves the fingers to be returned to normal. This varied disposition of the laps within cases of different dimensions, furnishes the best exposure of the labels upon the box-units, so their contents is indicated without opening the case. Fingers 700 are always effective to turn out the laps $n$ of all cases to guard against interference. The laps $m$ are left unturned. After the cases have been filled, the laps $m$ and $n$, together with either $k$ or $l$, are folded down to furnish a closure, $l$ or $k$ having been turned in to leave the opening for label-inspection.

The second test of the case upon the elevator K provides for stopping said elevator at a lower or upper level, to receive, respectively, two or one of the layers $i$. The feeler 718, movable above the feeler 638 (Fig. 15), is actuated by the same elevator-cam 640 and controls the valve $v$ (Fig. 34). The connection of the valve, to the actuating cylinder 722 of the pneumatic system Q (Fig. 36), is such that the piston of said cylinder normally holds the contact-piece 738 upon the stop-rod 732 in registration with the slot in the operating member 740 upon the elevator (Figs. 40 and 41). This is the relation for a one-layer case with which the feeler would not contact, and the parts of the valve $v$ would remain in their normal relation. The operating member, therefore, passes through the slot and strikes the collar 750 upon the stop-rod. The upward movement of the rod causes the collar 742 upon it to open the starting switch 564 of the motor 548, bringing the elevator to rest at its upper level. With a two-layer case, the movement of the feeler is limited by its engagement with the case-wall, and the relation of the valve-parts thereby changed. This, in a manner similar to the valve V, applies vacuum in the system Q to the cylinder 722, turning the stop-rod 732 through 90°. The contact-piece 738 is now across the slot in the operating member 740, so the rod is raised when the elevator is at the lower level to open the switch 564.

For a two-layer case the vertically reciprocating bars 508 must operate twice, and for a one-layer case but once. To cause the elevator K to remain for the proper length of time at each of the two levels, the gear 812, rotatable during the movement of the bars, carries the pins 816 and 818 (Figs. 12 and 40). The switch 820 is normally positioned to be closed by the pin 816, when the gear has been given a full turn during the packing of a two-layer case. The completion of the circuit energizes the solenoid 844, thus closing the switch 850 to reverse the rotation of the elevator-motor 548. If, however, the elevator ascends to its higher level with a one-layer case, the projection 862 upon it acts upon the valve 840. This applies vacuum to the cylinder 832 and shifts the switch 820, so it is closed by the pin 818 after the gear 812 is turned through but 180°. This, in the same manner as for the two-layer case, starts the descent of the elevator after the deposit in the case of a single layer of box-units. In either instance, upon the arrival of the elevator at its lower level, the projection 856 upon it depresses the rod 854, the collar 860 upon which opens the switch 850 in the reversing winding of the motor 548. The filled case has now depressed the contact member 550 (Fig. 14) and rests upon the conveyor 380, which carries it out of the apparatus. The cam 428 upon the elevator causes the successive depression of the stop-pins 404 and 402 (Fig. 28). The pins 404 release a case which has been tested by the mechanisms I and J, so it is delivered to the elevator by the conveyor 378 for packing. The pins 402 permit a case to be advanced to testing position from the series waiting upon said conveyor 378.

Having described our invention, what we claim as new and desire to secure by Letters Patent of the United States is:

1. In a machine for assembling articles, a movable member by which articles are positioned, means for measuring the space which the assembled articles are to occupy, and means controlled by the measuring means for moving the member in accordance with such measurement.

2. In a machine for assembling articles, movable members by which the articles are positioned, means for measuring a plurality of dimensions of the space which the assembled articles are to occupy, and means controlled by the measuring means for moving the members in accordance with the respective measurements.

3. In a machine for assembling and packing articles, a movable member by which the articles are positioned with reference to a case in which they are to be packed, means for measuring the case, and means controlled by the measuring means for moving the member in accordance with such measurement.

4. In a machine for assembling and packing articles, movable members by which the articles are positioned with reference to a case in which they are to be packed, means for measuring the width and length of the case, and means controlled by the measuring means for moving the members in accordance with such measurements.

5. The combination with mechanism for assembling articles, of opposite relatively movable walls between which the articles are assembled, means for measuring a space which the assembly is to occupy, and means controlled by the measuring means for producing relative movement of the walls to vary the distance between them in accordance with the measurement.

6. In a machine for assembling articles and packing them in a case, a member movable to advance a row of articles toward the case, a detector movable to different positions and thereby controlling the number of articles in the row advanced, means for measuring a dimension of the case in which the assembled articles are to be packed, and means controlled by the measuring means for producing movement of the detector in accordance with the measurement.

7. In a machine for assembling articles and packing them in a case, opposite relatively movable walls between which the articles are assembled, a member movable to advance a row of articles toward the case, a detector mounted upon one of the relatively movable walls and controlling the movable member, means for measuring a dimension of the case in which the assembled articles are to be packed, and means controlled by the measuring means for producing relative movement of the walls in accordance with the measurement.

8. In a machine for assembling articles and packing them in a case, a member movable to carry articles above the case, means for measuring a dimension of the case, and means controlled by the measuring means for moving the member in accordance with the measurement.

9. In a machine for assembling articles and packing them in a case, a member movable to deposit articles in the case, means for measuring a dimension of the case, and means controlled by the measuring means for moving the member in accordance with the measurement.

10. In a machine for assembling articles and packing them in a case, a member movable to carry articles above the case, a member movable to deposit articles in the case, means for measuring two dimensions of the case, and means controlled by the measuring means for moving the members in accordance with the measurement.

11. In a machine for assembling articles and packing them in a case, opposite relatively movable walls between which the articles are assembled, a member movable to deposit the articles from between the walls into the case, means for measuring two dimensions of the case, means controlled by the measuring means for producing relative movement of the walls in accordance with one measurement, and means controlled by the measuring means for moving the member in accordance with the other measurement.

12. In a machine for assembling articles and packing them in a case, a member movable to carry articles above the case, opposite relatively movable walls between which the articles are assembled, a member movable to deposit the articles from between the walls into the case, means for measuring two dimensions of the case, means controlled by the measuring means for producing relative movement of the walls in accordance with one measurement, a detector mounted upon the movable wall and controlling the first-mentioned movable member, and means controlled by the measuring means for moving the depositing member in accordance with the other measurement.

13. In a machine for packing articles in cases, packing mechanism, measuring mechanism for sensing the dimensions of the cases, actuating mechanism for the packing mechanism controlled by the measuring mechanism, means for advancing cases successively to the measuring and packing mechanism, and means for temporarily retaining each case at the measuring mechanism for its measurement and releasing it for advance to the packing mechanism.

14. In a machine for packing articles in cases, packing mechanism, measuring mechanism for sensing the dimensions of the cases, actuating mechanism for the packing mechanism controlled by the measuring mechanism, means for advancing cases successively to the measuring and packing mechanisms, means for temporarily retaining each case at the measuring mechanism for its measurement, and means controlled at the packing mechanism for releasing the retained case for advance to said packing mechanism.

15. In a machine for packing articles in cases, packing mechanism including an elevator for the cases, measuring mechanism for sensing the dimensions of the cases, actuating mechanism for the packing mechanism controlled by the measuring mechanism, means for advancing cases successively to the measuring and packing mechanisms, means for temporarily retaining each case at the measuring mechanism for its measurement, and means controlled by movement of the elevator for releasing the retained case for advance to the packing mechanism.

16. In a machine for packing articles in cases, packing mechanism, a conveyor for advancing cases to the packing mechanism, a stop device for the advancing cases movable above and below the conveyor, a roll situated in front of the stop device, and means for rotating the roll to advance the cases and to raise them above the stop device.

17. In a machine for packing articles in cases, a member movable to deposit articles in a case, means for measuring a dimension of the case, and means controlled by the measuring means for moving the member at a time determined by the measurement.

18. In a machine for packing articles in cases, a member movable to assemble rows of articles in a layer, a member movable to deposit the assembled layer in a case, means for sensing the size of a case to be filled; means controlled by said sensing means for variably controlling the number of rows to be assembled in a layer, and means for moving the depositing member under the control of the layer-assembling member.

19. In a machine for packing articles in cases, a member movable to deposit articles in a case, a device movable against the side of the case, means for variably determining the time of operation of the depositing member, and means operated by said device for controlling said last-named means.

20. In a machine for packing articles in cases, a member movable to deposit articles in a case, a device movable against the side of the case, a cam connected to said device and movable to different extents as a result of variation in the movement of the device, a detector actuated by the cam and positioned for engagement by one of the articles before being deposited in the case, and means controlled by the detector for determining the time of operation of the depositing member.

21. In a machine for packing articles in cases, a member movable to deposit articles in a case, a device movable against the side of the case, a clutch through which the device is moved, means for causing engagement of the clutch, and means controlled by the extent of movement of the device for determining the time of operation of the depositing member.

22. In a machine for packing articles in cases, a member movable to assemble rows of articles in a layer, a member movable to deposit the assembled layer in a case, a device movable against the side of the case, a clutch through which the device is moved, means for carrying the case into and out of layer-receiving position, means for controlling the movement of the case-carrying means, means operated by the movement-controlling means for causing the engagement of the clutch, and means controlled by the extent of movement of the device for determining the time of operation of the depositing member.

23. In a machine for packing articles in cases, a member movable to assemble rows of articles in a layer, a member movable to deposit the assembled layer in a case, a device provided with a plurality of portions selectively movable into the path of the articles as they are assembled in a layer, means controlled by a dimension of the case for setting the device, and means controlled by the device for determining the time of operation of the depositing member.

24. In a machine for packing articles in cases, a member movable to assemble rows of articles in a layer, a member movable to deposit the assembled layer in a case, a spindle provided with two arms, either of which may be positioned in the path of the articles as they are assembled in a layer, means controlled by a dimension of the case for turning the spindle to position an arm in the path of the articles, a detector actuated by the spindle, and means controlled by the detector for operating the depositing member.

25. In a machine for depositing articles in a case, spaced walls relatively yieldable with respect to each other and between which the articles are assembled in a layer, a reciprocatory member movable downwardly between the walls to deposit the layer in the case, means for reciprocating the member, a plurality of members for respective engagement by different numbers of articles between the walls, and means controlled by engagement of a variable predetermined number of said members by the articles for actuating said last-named means.

26. In a machine for assembling articles in a case, a conveyor by which a case is delivered to a packing section, an elevator receiving the case from the conveyor, a slide movable adjacent to the elevator in its receiving position, a contact member pivoted yieldably upon the slide, means acting upon the slide to hold the contact member yieldably in the path of the advancing case, means controlled by movement of the slide for operating the elevator, and packing means to which the elevator presents the case.

27. In a machine for assembling articles in a case, a conveyor by which a case is delivered to a packing section, an elevator receiving the case from the conveyor and having a wall against which the case may be positioned, means carried by the elevator for forcing the case against the wall, and packing means situated above the conveyor and to which the elevator presents the positioned case.

28. In a machine for assembling articles in a case, a conveyor by which a case is delivered to a packing section, an elevator receiving the case from the conveyor and having a wall against which the case may be positioned, means carried by the elevator for forcing the case against the wall, packing means situated above the conveyor and to which the elevator presents the positioned case, and means for rendering the forcing means ineffective when the elevator is in its case-receiving position.

29. The method of preparing for packing with articles cases provided with laps projecting from their walls and which when folded will leave exposed a portion of the articles, which consists in testing a dimension of each case on its way into packing position, and folding in one or another of the laps in accordance with the test.

30. The method of preparing for packing with articles cases provided with laps projecting from their walls and which when folded will leave exposed a portion of the articles, which consists in testing a dimension of each case on its way into packing position, folding out one or another of the laps in accordance with the test, and thereafter folding in another of said laps.

31. The method of packing with articles cases provided with laps projecting from their walls and which when folded will leave exposed a portion of the articles, which consists in testing a dimension of each case on its way into packing position, folding out one or another of the laps in accordance with the test, thereafter folding in another of said laps, and inserting the articles in the case while the lap is infolded.

32. The method of preparing for packing with articles cases provided with laps projecting from their walls and which when folded will leave exposed a portion of the articles, which consists in testing a dimension of each case, folding out a lap in accordance with the test, and thereafter folding in another of the laps as determined by the lap which had previously been folded out.

33. The method of preparing for packing with articles cases provided with laps projecting from their walls and which when folded will leave exposed a portion of the articles, which consists in testing a dimension of each case, folding one or another of the laps in accordance with the test, and folding out one lap for each case without reference to the test.

34. The combination with an elevator for packing cases provided with laps extending from their walls, of a lap-turning finger situated beside the elevator, said finger being inclined upwardly and inwardly and lying in the path of the lap of a case upon the elevator, the finger having an end-portion inclined inwardly and downwardly over the case-lap, and means mounting the finger for outward yielding movement.

35. In a machine for assembling articles in a case, the combination with means for moving a case provided with laps extending from its walls, of a lap-turning member co-operating with the moving means and arranged for engagement with a case-lap during the movement of the case, said member being mounted to yield away from the case under the influence of the moving lap, and means carried by said member for moving the lap outwardly in response to yielding movement of said member.

36. The combination with an elevator for a case provided with laps extending from its walls, of a lap-turning finger situated beside the elevator, the finger having an end-portion inclined inwardly and downwardly over a case-lap, and a mounting for the finger upon which it may yield when the lap engages the end-portion of said finger.

37. The combination with an elevator for a case provided with laps extending from its side walls, of lap-turning means situated beside the path of the elevator and having a pivoted mounting, a power-cylinder, and a piston in the cylinder connected to the mounting.

38. The combination with an elevator for a case provided with laps extending from its walls, of lap-turning means situated beside the path of the elevator and having a pivoted mounting, a sleeve pivoted to the mounting, a rod passing yieldably through the sleeve, a power-cylinder, and a piston in the cylinder connected to the rod.

39. In a machine for assembling articles in cases having laps, a member movable to test a dimension of a case, and a folding member acting upon a case-lap and controlled by the testing member.

40. In a machine for assembling articles in cases having laps, means for moving the case, a member movable to test a dimension of a case, means for initiating the movement of the testing member in the movement of the case, and a folding member acting upon a case-lap and controlled by the testing member.

41. In a machine for assembling articles in cases having laps, means for moving the cases, a member movable to test a dimension of a case, means for initiating the movement of the testing member in the movement of the case and immediately thereafter retracting the member from its testing position, and a folding member acting upon a case-lap and controlled by the testing member.

42. In a machine for assembling articles in cases having laps, a member movable to test a dimension of a case, a normally effective member for folding a case-lap, and means controlled by the testing member for rendering the folding member ineffective.

43. The combination with means for moving a case provided with laps extending from its walls, of a lap-turning finger situated beside the moving means and projecting over a case-lap to receive contact therewith upon movement of the case, and means for moving the finger away from the case.

44. The combination with means for moving a case provided with laps extending from its walls, of a lap-turning finger situated beside the moving means and projecting over a case-lap to receive contact therewith upon movement of the case, means for testing a dimension of the case, and means controlled by the testing means for moving the finger out of the path of the lap.

45. In a machine for assembling articles in cases having laps, a movable lap-folding member, a feeler movable to test a dimension of a case, fluid-actuated means for moving the folding member, and a valve governed by the feeler for controlling the fluid-actuated means.

46. In a machine for assembling articles in cases having laps, a movable lap-folding member, a feeler movable to test a dimension of a case, fluid-actuated means for moving the folding member, a valve for controlling the fluid-actuated means and having a cylinder and plunger, means for moving the cylinder, and means for connecting the plunger to the feeler.

47. The combination with means for moving a case provided with laps extending from its walls, of a lap-turning member co-operating with the moving means and arranged for engagement with a case-lap during its movement, a feeler movable to test a dimension of the case, fluid-actuated means for moving the turning member, and a valve controlling the fluid-actuated means and having portions movable by the case-moving means and governed by the feeler.

48. The combination with means for moving a case provided with laps extending from its walls, of a lap-turning member situated above the case and arranged for engagement with a case-lap during its movement, a feeler movable to test a dimension of the case, fluid-actuated means for moving the turning member, a valve controlling the fluid-actuated means and including a cylinder and plunger, the plunger being connected to the feeler, and means carried by the case-moving means for causing the movement of the cylinder and plunger together in opposite directions.

49. The combination with an elevator for a packing case provided with laps extending from its walls, of a lap-turning member situated above the elevator and case and arranged for engagement with a case-lap during its movement, a feeler movable to test a dimension of the case, fluid-actuated means for moving the turning member, a valve controlling the fluid-actuated means and including a cylinder and plunger, the plunger being connected to the feeler, means carried by the elevator for causing the movement of the cylinder and plunger, and means for causing the plunger to move with the cylinder.

50. The combination with means for moving a case provided with laps extending from its walls, of a lap-turning member situated above the moving means and case and arranged for engagement with a case-lap during its movement, a feeler movable to test a dimension of the case, fluid-actuated means for moving the turning member, a valve controlling the pressure upon the fluid-actuated means and governed by the feeler, and a valve controlling the pressure applied through the first-mentioned valve.

51. In a machine for assembling articles in cases having laps, a member movable to test a dimension of a case, lap-folding members situated at two sides of the case, and means for causing the testing member to control selectively a folding member at one or the other of the sides of the case.

52. In a machine for assembling articles in cases having laps, a member movable to test a dimension of a case, lap-folding members situated at two sides of the case in lap-engaging relation, and means for causing the testing member to selectively render ineffective a folding member at one or the other of the side of the case.

53. In a machine for assembling articles in cases having laps, a member movable to test a dimension of a case, lap-folding members situated at two sides of the case, a valve having a portion movable to different positions for different degrees of movement of the testing member, and means made effective in accordance with the position of the valve for actuating a folding member at one or the other of the sides of the case.

54. In a machine for assembling articles in cases having laps, a member movable to test a dimension of a case, lap-folding members situated at two sides of the case, a valve having a portion movable to different positions for different degrees of movement of the testing member, and fluid-actuated mechanism for each folding member, said mechanism being made effective to move one or the other of the folding members in different positions of the valve.

55. In a machine for assembling articles in cases having laps, a feeler movable into contact with a wall of the case or past said wall, depending upon the size of the case, lap-folding fingers situated at two sides of the case, fluid-actuated mechanism for each folding finger, and a valve connected to both fluid-actuated mechanisms and differently set by the feeler to render one or the other of the fluid-actuated mechanism effective to move its finger.

56. The combination with means for moving packing cases provided with laps extending from their walls, of a lap-turning member normally situated in the path of the moving means and case, means controlled by the case for withdrawing the member from said case, and means controlled by the moving means for withdrawing the member from the path of said moving means.

57. The combination with means for moving packing cases provided with laps extending from their walls, of a lap-turning finger situated beside the moving means and projecting into the path of a case-lap to receive contact therewith upon movement of the case, and means carried by the moving means for withdrawing the finger from the path of said moving means in absence of a case thereon.

58. The combination with an elevator for packing cases provided with laps extending from their walls, of a lap-turning finger situated beside the elevator and projecting over a case-lap to receive contact therewith upon movement of the case, means controlled by the case for withdrawing the finger from above said case, and means carried by the elevator for withdrawing the finger from above said elevator.

59. The combination with an elevator for packing cases provided with laps extending from their walls, of a feeler for engagement with a case, a turning finger for engagement with a lap of a case upon the elevator, fluid-actuated means for moving the finger, a valve for controlling the moving means and having a movable cylinder and plunger, means for connecting the feeler and plunger, and a cam carried by the elevator for moving the cylinder.

60. The combination with an elevator for packing cases provided with laps extending from their walls, of a feeler for engagement with a case, a turning finger for engagement with a lap of a case upon the elevator, fluid-actuated means for moving the finger, a valve for controlling the moving means and having a movable cylinder and plunger, means for connecting the feeler and plunger, a cam carried by the elevator, and two levers acted upon by the cam and acting upon the cylinder and plunger respectively.

61. The combination with an elevator for packing cases provided with laps extending from their walls, of a feeler for engagement with a case, a turning finger for engagement with a lap of a case upon the elevator, fluid-actuated means for moving the finger, a valve for controlling the moving means and having a movable cylinder and plunger, means for connecting the feeler and plunger, a cam carried by the elevator, two levers acted upon by the cam to move the cylinder and plunger respectively, and means for causing the cylinder and plunger to move together.

62. The combination with means for moving a packing case provided with laps extending from its side walls, of a member normally effective in response to such movement of the case to turn one of the laps upon one face of a wall, means for moving said member to an ineffective position, and a constantly effective member for turning said one lap upon the other face of said wall.

63. The combination with an elevator for packing cases provided with laps extending from their walls, of a shaft rotatable beside the path of the elevator, a folding finger attached to the shaft, said finger being inclined upwardly and inwarly and lying in the path of a lap of a case upon the elevator, and means acting upon the shaft to hold the finger yieldably in lap-folding relation.

64. In a machine for assembling articles in cases, means for moving a case to different assembling positions, a member movable to test a dimension of the case, and means controlled by the member for determining the position to which the case is moved.

65. In a machine for packing articles in cases, an elevator for a case, means for advancing articles for deposit in the case, means for moving the elevator with the case to different article-receiving levels, a member movable to test the height of the case, and means controlled by the member for determining the level to which the elevator is moved.

66. In a machine for packing articles in cases, an elevator for a case, means for advancing articles for deposit in the case, means for moving the elevator with the case to different article-receiving levels, a feeler movable toward a wall of the case, movable stop mechanism for the elevator, and means controlled by the feeler for moving the stop mechanism into different effective positions.

67. In a machine for packing articles in cases, an elevator for a case, means for advancing articles for deposit in the case, means for moving the elevator with the case to different article-receiving levels, a feeler movable toward a wall of the case, movable stop mechanism for the elevator, fluid-actuated means for moving the stop mechanism, and a valve governed by the feeler for controlling the fluid-actuated means.

68. In a machine for packing articles in cases, an elevator for a case, means for advancing articles for deposit in the case, means for moving the elevator with the case to different article-receiving levels, a feeler movable toward a wall of the case, a movable stop-rod along which the elevator travels and by which it is controlled, said rod being rotatable and longitudinally movable, means governed by the feeler for rotating the rod, and a member carried by the elevator and acting upon the stop-rod in one only of its rotary positions to control the elevator.

69. In a machine for packing articles in cases, an elevator for a case, means for advancing articles for deposit in the case, means for moving the elevator with the case to different article-receiving levels, a feeler movable toward a wall of the case, a movable stop-rod provided with a contact-piece having an opening, along which rod the elevator travels and by which it is controlled, said rod being rotatable and longitudinally movable, and a member carried by the elevator and arranged to engage the contact-piece and lift the stop-rod in one rotary position of said rod and to pass idly through the opening in the contact-piece in another rotary position.

70. In a machine for assembling articles in cases having laps, an elevator for a case, means for moving the elevator with the case to different article-receiving positions, a movable folding member acting upon a case-lap, a member movable to test a dimension of the case, means governed by the testing member for controlling the elevator-moving means, a second member movable to test another dimension of the case, and means governed by the second testing member for controlling the lap-folding means.

71. In a machine for assembling articles in cases having laps, an elevator for a case, means for moving the elevator with the case to different article-receiving positions, a member movable to govern the travel of the elevator, fluid-actuated means for moving said member, a feeler engaging the case, a valve governed by the feeler for controlling the fluid-actuated means, a movable folding member acting upon a case-lap, a second fluid-actuated means for moving the folding member, a second feeler engaging the case, and a valve governed by the second feeler for controlling the second fluid-actuated means.

72. The combination with means for moving a case provided with laps, of a member movable during the movement of the case to fold one of said laps inside the case, means for thus moving said member, and means for depositing articles in the case and retaining therein the folded lap.

73. The combination with an elevator for packing cases provided with laps, of a finger movable bodily with the elevator and movable into the case thereon in contact with the lap, means for thus moving the finger into the case, and means for depositing articles in the case and retaining therein the folded lap.

74. The combination with an elevator for packing cases provided with laps, of a slide movable along the path of the elevator, a lap-folding finger rotatable upon the slide, and means for rotating the finger in engagement with a lap to move the lap against an inner wall of the case.

75. The combination with an elevator for packing cases provided with laps, of a slide movable along the path of the elevator and having a surface by which a lap is deflected inwardly, a lap-folding finger rotatable upon the slide, and means for rotating the finger in engagement with a lap to move the lap against an inner wall of the case.

76. The combination with an elevator for a packing case provided with laps projecting from its walls, of a finger movable at each of plural case-walls, and means acting in the path of movement of the elevator for turning the fingers against the laps and into the case.

77. In a machine for assembling articles in cases provided with laps extending from plural side walls, movable members by which laps upon one or another of the side walls are folded in one direction, movable members co-operating with the same walls as the first-mentioned members for folding the laps previously unfolded in the direction opposite to that produced by the first-mentioned members, and means for moving said lap-folding members.

78. In a machine for assembling articles in cases provided with laps extending from plural side walls, movable members by which laps from one or another of the side walls are folded selectively outside the case, movable members co-operating with the same walls as the out-folding members for folding the laps previously unfolded inside the case, and means for moving said lap-folding members.

79. In a machine for assembling articles in cases provided with laps extending from plural side walls, movable members by which laps from one or another of the side walls are folded outside the case, means controlled by a dimension of the case for determining which of the laps shall be folded, movable members co-operating with the same walls as the out-folding members for folding the laps previously unfolded inside the case, and means for moving said lap-folding members.

80. In a machine for packing articles in cases, means movable to present a case in position for packing, a member movable to deposit articles in the case, means controlled by the size of the case for moving the member a certain number of times according to the size of the case, and means governed by said moving means for controlling the movement of the case-presenting means.

81. In a machine for packing articles in cases, an elevator raised to present a case for packing, a reciprocatory member for depositing articles in the case, means controlled by the depth of the case for actuating the member a certain number of times according to the depth of the case, and means governed by said actuating means for determining the time of descent of the elevator.

82. In a machine for packing articles in cases, means movable to present a case in position for packing, a member movable to deposit articles in the case, mechanism rotatable to different degrees for moving the member a different number of times for packing cases of different dimensions, and means governed by the degree of rotation of the moving mechanism for controlling the movement of the case-presenting means.

83. In a machine for packing articles in cases, an elevator raised to present a case for packing, a reciprocatory member for depositing articles in the case, gearing for actuating the member and having a plurality of projections, a controlling device for the elevator arranged to be differently positioned with respect to the projections to cause the descent of the elevator at different times, and means governed by the extent of rise of the elevator to position the controlling device.

84. In a machine for packing articles in cases, an elevator raised to present a case for packing, a motor for operating the elevator, a controlling device for reversing the motor, electrical means for actuating the controlling device, a packing member, means for operating the packing member, a control member movable in response to operation of the packing member in the packing of the case upon the elevator, and a switch actuated in response to movement of the control member for governing the circuit of the electrical means.

85. In a machine for packing articles in cases, an elevator raised to present a case for packing, a motor for operating the elevator, a controlling device for reversing the motor, electrical means for actuating the controlling device, a packing member, means for operating the packing member, a control member movable in response to operation of the packing member in the packing of the case upon the elevator, a switch actuated upon movement of the control member for governing the circuit of the electrical means and controlled in the movement of the elevator, and means for positioning the switch in preparation for actuation by said control member upon a definite number of operations of the packing member.

86. In a machine for packing articles in cases, an elevator raised to present a case for packing, a motor for operating the elevator, a controlling device for reversing the motor, electrical means for actuating the controlling device, a packing member, means for operating the packing member, a control member movable in response to operation of the packing member in the packing of the case upon the elevator, a switch actuated upon movement of the control member for governing the circuit of the electrical means, fluid-operated means for positioning the switch in preparation for actuation by the control member upon a definite number of operations of said packing member, and a valve controlled by the elevator for governing the application of fluid to the positioning means.

87. In a machine for packing articles in cases, an elevator for a case, means for advancing articles for deposit in the case, means for moving the elevator with the case to different article-receiving positions, a member movable to test a dimension of the case, means controlled by the member for determining the position to which the elevator is moved, a reciprocatory member for depositing articles in the case upon the elevator, means for actuating the member a different number of times for the packing of cases of different depths, and means governed by said actuating means for reversing the travel of the elevator.

88. In a machine for packing articles in cases, an elevator raised to present a case for packing, a motor for operating the elevator, a controlling device for reversing the motor, electrical means for actuating the controlling device, a packing member, means for operating the packing member, a control member movable in response to operation of the packing member in the packing of the case upon the elevator, a switch actuated in response to movement of the control member for governing the circuit of the electrical means, and means actuated by the elevator for rendering the controlling device ineffective.

89. In a machine for packing articles in cases, an elevator raised to present a case for packing, a reciprocatory member for depositing articles in the case, an electric motor for operating the elevator, a reversing switch for the motor, a solenoid for closing the switch, a switch controlled in the movement of the reciprocatory member for energizing the solenoid to close the reversing switch, and means acting in the movement of the elevator for opening the reversing switch.

90. In a machine for packing articles in cases, an elevator raised to present a case for packing, a reciprocatory member for depositing articles in the case, an electric motor for operating the elevator, a reversing switch for the motor provided with a lever through which it is operated, a solenoid having its plunger connected to the lever, and a member arranged for engagement with the lever to open the reversing switch and being movable by the elevator in its descent.

91. In a machine for assembling and packing articles, a movable member by which the articles are positioned with reference to a case in which they are to be packed, means for moving the case into packing position, means for measuring the case, means controlled by the measuring means for moving the positioning member in accordance with such measurement, and means controlled by the case-moving means for initiating the action of the measuring means.

92. In a machine for assembling and packing articles, a movable member by which the articles are positioned with reference to a case in which they are to be packed, means for measuring the case, means controlled by the measuring means for moving the member in accordance with such measurement, an elevator by which the case is moved into and out of packing position, and a member movable to control the travel of the elevator and acting to initiate the action of the case-measuring means.

93. In a machine for assembling and packing articles, a movable member by which the articles are positioned with reference to a case in which they are to be packed, means movable to measure the case, means controlled by the moving means for moving the positioning member in accordance with such measurement, a clutch through which the measuring means is moved, an elevator by which the case is moved into and out of packing position, and a member movable to control the travel of the elevator and to cause the engagement of the clutch.

94. In a machine for assembling articles, a movable member by which articles are positioned, a plurality of units movable to test the space which the articles are to occupy and to be set in a group according to a dimension of the space, and means controlled by said units for moving the positioning member differently in accordance with the varying number of set units in the group.

95. In a machine for assembling and packing articles, a movable member by which the articles are positioned with reference to a case in which they are to be packed, a series of testing units provided with feelers, means for moving the series of units toward the case, contact of the feelers in a group of the units which engage the case setting such units in positions determined by the contact, the remainder of the series of units remaining unset, and means for moving the positioning member, the set and unset units co-operating to control the movement of said member.

96. In a machine for assembling articles and packing them in a case, opposite relatively movable walls between which the articles are assembled, a rotatable member for producing the relative movement, means for measuring a dimension of the case, and mechanism controlled by the measuring means for determining the direction of rotation of the member.

97. In a machine for assembling articles and packing them in a case, opposite relatively movable walls between which the articles are assembled, means for producing the relative movement, means for measuring a dimension of the case, and mechanism controlled by the measuring means for determining the extent of relative movement between the walls.

98. In a machine for assembling and packing articles, a movable member by which the articles are positioned with reference to a case in which they are to be packed, a series of testing units provided with feelers, means for moving the series of units toward the case, the contact of the feelers in a group of the units which engage the case setting such units, the remainder of the series of units remaining unset, a switch closed by relative movement between the terminal-unit of the set group and the adjacent unit of those unset, a rotatable actuating member for the positioning member, means for driving the actuating member in opposite directions, a device energized through the closed switch for determining the direction in which the actuating member is driven, and a device energized through said closed switch for disconnecting the actuating member from the driving means.

99. In a machine for packing articles in cases of different dimensions, a positioning member movable into different locations for co-operation with different cases, and controlling means for the positioning member comprising a shaft, means for moving the shaft toward the case, a series of feelers rotatable upon the shaft and movable thereby toward and from a case-wall to test it by contact therewith, adjacent feelers of the series being so arranged as to lie at opposite sides of the end of each of the case-walls to be tested and a controlling device having portions carried with each of the feelers of each adjacent pair.

100. In a machine for packing articles in cases of different dimensions, a positioning member movable into different locations for co-operating with different cases, and controlling means for the positioning member comprising a shaft, means for moving the shaft toward the case, a series of feelers rotatable upon the shaft and movable thereby toward and from a case-wall to test it by contact therewith, adjacent feelers of the series being so arranged as to lie at opposite sides of the end of each of the case-walls to be tested, a switch carried with one of the feelers of each adjacent pair and an operating member for the switch movable by the other feeler of each pair.

101. In a machine for packing articles in cases of different dimensions, a positioning member movable into different locations for co-operation with different cases, means for thus moving the member, means for testing a dimension of a case and having a plurality of feelers for different sizes of cases to be tested, a switch governed by each feeler, and electrical devices in circuit with each switch and controlling the direction and extent of travel of the member.

102. In a machine for packing articles in cases of different dimensions, a positioning member movable into different locations for co-operation with different cases, means for thus moving the member, means for testing a dimension of a case and having a plurality of feelers for different sizes of cases to be tested, a switch governed by each feeler, a relay in circuit with each switch and controlling the direction of travel of the member, and a solenoid in circuit with each switch for controlling the extent of travel of said member.

103. In a machine for packing articles in cases of different dimensions, a positioning member movable into different locations for co-operation with different cases, means for thus moving the member, means for testing a dimension of a case and having a plurality of feelers for different sizes of cases to be tested, a switch governed by each feeler, a relay in circuit with each switch, the relays being variable in position, contacts through which the energized relays close circuits controlling the direction of travel of the member, and means whereby the contacts are rotated during the travel of the member.

104. In a machine for packing articles in cases of different dimensions, a positioning member movable into different locations for co-operation with different cases, means for thus moving the member, means for testing a dimension of a case and having a plurality of feelers for different sizes of cases to be tested, a switch governed by each feeler, a relay in circuit with each switch, a mounting for the relays, means for securing the relays at different points upon the mounting, contact-segments through which the energized relays close circuits controlling the direction of travel of the member, and means whereby the segments are rotated during the travel of the member.

105. In a machine for packing articles in cases of different dimensions, a positioning member movable into different locations for co-operation with different cases, means for thus moving the member, means for testing a dimension of a case and having a plurality of feelers for different sizes of cases to be tested, a switch governed by each feeler, a relay in circuit with each switch, contact-segments through which the energized relays close circuits controlling the direction of travel of the member, and means whereby the segments are rotated during the travel of the member, there being a space between the segments, the arrival of which at the energized relay will open the travel-controlling circuit.

106. In a machine for packing articles in cases of different dimensions, a positioning member movable to different locations for co-operation with different cases, a rotatable actuating member by which the positioning member is moved, driving mechanism for the actuating member, a clutch through which the actuating member is driven, means for testing a dimension of a case and having a plurality of feelers for different sizes of cases to be tested, a switch governed by each feeler, an electro-magnet in circuit with each switch, a mounting for each electro-magnet located differently to correspond to the dimensions of different cases, a stop device set by each electro-magnet, a clutch-operating member by which the stop devices are carried, and means movable with the positioning member for engagement with the set stop device.

107. In a machine for packing articles in cases of different dimensions, a positioning member movable to different locations for co-operation with different cases, a rotatable actuating member by which the positioning member is moved, driving mechanism for the actuating member having oppositely rotatable gears, a clutch movable into engagement with either of the gears, means for testing a dimension of a case and having a plurality of feelers for different sizes of cases to be tested, a switch governed by each feeler, an electro-magnet in circuit with each switch, a mounting for each electro-magnet located differently to correspond to the dimensions of different cases, a stop device set by each electro-magnet, a clutch-operating member by which the stop devices are carried, and means movable with the positioning member for engagement with the set stop device.

108. In a machine for packing articles in cases of different dimensions, a positioning member movable to different locations for co-operation with different cases, means for moving the positioning member in opposite directions, a movable stop, means operative upon shifting of the stop to interrupt operation of the moving means, means for setting the stop, and a contact member movable upon the positioning member for engagement with the stop and effective to shift the stop and act in the same manner upon the moving means for the approach of the contact member to the stop from either side.

109. In a machine for packing articles in cases of different dimensions, a positioning member movable to different locations for co-operation with different cases, a rotatable shaft having threaded engagement with the positioning member, means for determining the direction of rotation of the shaft, means for testing a dimension of a case and having a plurality of feelers for different sizes of cases to be tested, a switch governed by each feeler, a solenoid having its winding in circuit with each switch, a mounting upon which the solenoids are located differently to correspond to the dimensions of different cases, a rod extending along the shaft and connected to the direction-determining means, a stop-pin carried by the rod for each solenoid and arranged to be set thereby, a member movable by the shaft in opposite directions along the rod, and a slide movable upon the member oppositely to a limited extent and having a projection for engagement with opposite sides of the set pin.

110. In a machine for assembling articles, a pair of walls between which articles are positioned, means for delivering articles between said walls, means adjustably mounting one of said walls, a rotatable threaded shaft, a nut carried by the movable wall and engaging the shaft, and gearing for rotating the shaft in opposite directions to adjust the position of the movable wall.

111. In a machine for assembling articles, a pair of walls between which articles are positioned, means for delivering articles between said walls, means adjustably mounting one of said walls, a rotatable threaded shaft, a nut carried by the movable wall and engaging the shaft, a driving bevel-gear, driven bevel-gears surrounding the shaft at opposite sides of the driving gear and meshing therewith, and a clutch for connecting either of the driven gears with the shaft for adjusting the position of the movable wall in either of two directions.

CUTLER D. KNOWLTON.
FRANK R. THRESH.

REFERENCES CITED

The following references are of record in the file of this patent:

UNITED STATES PATENTS

| Number | Name | Date |
|---|---|---|
| 952,423 | Droitcour | Mar. 15, 1910 |
| 1,205,968 | Blankenship | Nov. 28, 1916 |
| 1,243,407 | Hawthorne | Oct. 16, 1917 |
| 1,247,722 | Rogers et al. | Nov. 27, 1917 |
| 1,293,182 | Parker | Feb. 4, 1919 |
| 1,568,082 | Mitton | Jan. 5, 1926 |
| 1,587,556 | Schilbach | June 8, 1926 |
| 1,855,047 | Giles | Apr. 19, 1932 |
| 1,961,366 | Knowlton | June 5, 1934 |
| 1,974,165 | Stage | Sept. 18, 1934 |
| 1,991,223 | Ledig et al. | Feb. 12, 1935 |
| 2,051,105 | Roberts | Aug. 18, 1935 |
| 2,051,190 | Van Buren | Aug. 18, 1936 |
| 2,058,729 | Sekulski | Oct. 27, 1936 |
| 2,111,901 | Ness | Mar. 22, 1938 |
| 2,252,127 | Kimball | Aug. 12, 1941 |
| 2,254,097 | Wood | Aug. 26, 1941 |
| 2,318,598 | Davis | May 11, 1943 |
| 2,324,401 | Kimball | July 13, 1943 |